US007645515B2

(12) United States Patent
Furuya et al.

(10) Patent No.: US 7,645,515 B2
(45) Date of Patent: Jan. 12, 2010

(54) TRANSFER ARRANGEMENT AND IMAGE FORMING APPARATUS

(75) Inventors: Satoru Furuya, Tokyo (JP); Mitsuru Kishimoto, Tokyo (JP)

(73) Assignee: Oki Data Corporation, Tokyo (JP)

( * ) Notice: Subject to any disclaimer, the term of this patent is extended or adjusted under 35 U.S.C. 154(b) by 176 days.

(21) Appl. No.: 10/972,649

(22) Filed: Oct. 26, 2004

(65) Prior Publication Data

US 2005/0095437 A1 May 5, 2005

(30) Foreign Application Priority Data

Oct. 29, 2003 (JP) ............................ 2003-368525

(51) Int. Cl.
*B32B 27/40* (2006.01)
*G03G 15/16* (2006.01)
*H01B 1/12* (2006.01)

(52) U.S. Cl. ..................... 428/423.1; 399/310; 252/500

(58) Field of Classification Search .............. 428/423.1; 399/310; 252/500
See application file for complete search history.

(56) References Cited

U.S. PATENT DOCUMENTS 6,810,225 B2 * 10/2004 Kitano et al. ............... 399/176

FOREIGN PATENT DOCUMENTS

| | | |
|---|---|---|
| JP | 07248669 | 9/1995 |
| JP | 09050197 | 2/1997 |
| JP | 10133496 | 5/1998 |
| JP | 2002-014543 | 1/2002 |
| JP | 2002212420 | 7/2002 |
| JP | 2002244452 | 8/2002 |
| JP | 2003156902 | 5/2003 |
| JP | 2003202764 | 7/2003 |
| JP | 2003270962 | 9/2003 |
| WO | WO-02/056119 | 7/2002 |

* cited by examiner

*Primary Examiner*—Thao T. Tran
(74) *Attorney, Agent, or Firm*—Rabin & Berdo, P.C.

(57) ABSTRACT

A transfer arrangement is used in a transfer portion of an image forming apparatus. The transfer arrangement includes an electrically conductive member that contacts a toner image bearing member of the image forming apparatus. The electrically conductive member is made of polyurethane resin to which electrically conducive polymer is added. An adding amount of the electrically conductive polymer with respect to the polyurethane resin is from 8 wt % to 40 wt %.

15 Claims, 16 Drawing Sheets

| | ELECTRIC RESISTANCE | RESISTANCE (AT CURRENT OF 10μA) | VOLTAGE DEPENDENCY ΔR | COMPARISON VOLTAGES |
|---|---|---|---|---|
| TRANSFER ROLLER EP | $4.75\times10^{7}\Omega$ (1000V) | $7.81\times10^{7}\Omega$ (781V) | 0.75 | 460V/920V |
| TRANSFER/ CONVEYER BELT PAI | $4.91\times10^{7}\Omega$ (200V) | $2.49\times10^{7}\Omega$ (249V) | 0.86 | 160V/320V |
| TRANSFER MEMBER EP+PAI | — | $1.03\times10^{8}\Omega$ (1030V) | 0.78 | 620V/1240V |

| | ELECTRIC RESISTANCE | RESISTANCE (AT CURRENT OF 10 μA) | VOLTAGE DEPENDENCY ΔR | COMPARISON VOLTAGES |
|---|---|---|---|---|
| TRANSFER ROLLER EP (1) | $2.86 \times 10^7 \Omega$ (1000V) | $6.85 \times 10^7 \Omega$ (685V) | 0.80 | 420V/840V |
| TRANSFER/ CONVEYER BELT PU (1) | $7.07 \times 10^7 \Omega$ (200V) | $4.94 \times 10^7 \Omega$ (494V) | 0.26 | 330V/660V |
| TRANSFER MEMBER EP (1)+PU (1) | — | $1.18 \times 10^8 \Omega$ (1179V) | 0.57 | 690V/1380V |

| | ELECTRIC RESISTANCE | RESISTANCE (AT CURRENT OF 10μA) | VOLTAGE DEPENDENCY ΔR | COMPARISON VOLTAGES |
|---|---|---|---|---|
| TRANSFER ROLLER EP (2) | $7.45 \times 10^7 \Omega$ (1000V) | $9.02 \times 10^7 \Omega$ (902V) | 0.70 | 500V/1000V |
| TRANSFER/ CONVEYER BELT PU (1) | $7.07 \times 10^7 \Omega$ (200V) | $4.94 \times 10^7 \Omega$ (494V) | 0.26 | 330V/660V |
| TRANSFER MEMBER EP (2)+PU (1) | — | $1.37 \times 10^8 \Omega$ (1371V) | 0.53 | 905V/1810V |

| | ELECTRIC RESISTANCE | RESISTANCE (AT CURRENT OF 10 μA) | VOLTAGE DEPENDENCY ΔR | COMPARISON VOLTAGES |
|---|---|---|---|---|
| TRANSFER ROLLER EP (3) | $1.11\times10^{8}\Omega$ (1000V) | $1.04\times10^{8}\Omega$ (1040V) | 0.63 | 590V/1180V |
| TRANSFER/CONVEYER BELT PU (1) | $7.07\times10^{7}\Omega$ (200V) | $4.94\times10^{7}\Omega$ (494V) | 0.26 | 330V/660V |
| TRANSFER MEMBER EP (3)+PU (1) | — | $1.53\times10^{8}\Omega$ (1534V) | 0.49 | 1080V/2160V |

| ADDING AMOUNT OF POLYPYRROL (wt %) | TOTAL RESISTANCE (Ω) |
|---|---|
| 8 | $1.02 \times 10^9$ |
| 12 | $4.35 \times 10^8$ |
| 20 | $7.07 \times 10^7$ |
| 40 | $1.15 \times 10^6$ |

| VOLTAGE DEPENDENCY ΔR | L/L ENVIRONMENT | N/N ENVIRONMENT | TOTAL EVALUATION |
|---|---|---|---|
| 0 | ○ | ○ | ◎ |
| 0.05 | ○ | ○ | ◎ |
| 0.15 | ○ | ○ | ◎ |
| 0.26 | ○ | ○ | ◎ |
| 0.34 | △ | ○ | ○ |
| 0.5 | × | × | × |
| 0.86 | × | × | × |

| | ELECTRIC RESISTANCE | RESISTANCE (AT CURRENT OF 10μA) | VOLTAGE DEPENDENCY ΔR | COMPARISON VOLTAGES |
|---|---|---|---|---|
| TRANSFER ROLLER SIcd | — | $2.69 \times 10^6 \Omega$ (27V) | — | — |
| TRANSFER/CONVEYER BELT PU (2) | $7.07 \times 10^7 \Omega$ (200V) | $4.94 \times 10^7 \Omega$ (494V) | 0.25 | 345V/690V |
| TRANSFER MEMBER SIcd+PU (2) | — | $5.21 \times 10^7 \Omega$ (521V) | 0.27 | 345V/690V |

| | K | Y | M | C |
|---|---|---|---|---|
| APPLIED VOLTAGE | 3290V | 3580V | 3910V | 4340V |

FIG.28

| | K | Y | M | C |
|---|---|---|---|---|
| APPLIED VOLTAGE | 3290V | 3420V | 3750V | 4180V |

FIG.29

| | K | Y | M | C |
|---|---|---|---|---|
| APPLIED VOLTAGE | 3290V | 3580V | 3580V | 3580V |
| FIXED RESISTER | 100MΩ | 100MΩ | 62MΩ | 13MΩ |

TRANSFER ARRANGEMENT AND IMAGE FORMING APPARATUS

BACKGROUND OF THE INVENTION

This invention relates to a transfer arrangement composed of electrically conductive members such as a transfer and transport belt and a transfer roller, and relates to an image forming apparatus using the transfer arrangement.

In an image forming apparatus such as a color electrophotographic printer (a tandem type printer) in which a recording medium is transported along a single path, a transfer voltage is applied by a transfer power source to a photosensitive drum and a shaft of a transfer roller. A transfer and transport belt (hereinafter, referred to as a transfer/transport belt) and a recording medium are nipped by the transfer roller and the photosensitive drum. Due to the transfer voltage, a toner is transferred from the photosensitive drum to the recording medium.

As the toner moves from the photosensitive drum to the recording medium, and an electric charge also moves from a part of the surface of the photosensitive drum (where the toner does not exist) to the recording medium, the current flows between the photosensitive drum and the recording medium. This current is referred to as a transfer current. There is a close relationship between the transfer current and printing quality. In the color electrophotographic printer, transfer units of black, yellow, magenta and cyan respectively have transfer power units, and the transfer voltages applied by the transfer power units are individually controlled so as to generate the optimum transfer currents.

A transfer arrangement of each transfer unit is composed of electrically conductive members, i.e., a transfer/transport belt and a transfer roller. The transfer/transport belt contacts the recording medium and the photosensitive drum (i.e., a toner image bearing member). The transfer roller does not directly contact the toner image bearing member, but forms a suitable nip against the toner image bearing member. The transfer roller is made of a conductive shaft and a conductive resilient portion formed on the conductive shaft.

Conventionally, the conductive resilient layer of the transfer roller is made of, for example, insulation material such as silicone, polyurethane, epichlorohydrin, NBR (nitrile-butadiene rubber), EPDM (ethylene-propylene-diene monomer) to which electrolyte (such as salt including an element of group 1 or 2 of the periodic table or ammonium salt), electrically conducive polymer or carbon black is added as conductive material.

Further, the transfer/transport belt is made of, for example, insulation material such as polycarbonate (PC), polyvinylidene fluoride (PVDF), polyimide (PI), polyamideimide (PAI) or ethylene tetrafluoroethylene (ETFE) to which carbon black is added as conductive material.

Conventionally, there is a type of transfer arrangement made of an electrically conductive member having a characteristics that current increases in ohmic way as the applied voltage increases but resistance (i.e., electric resistance) does not change even when the applied voltage changes. There is another type of transfer arrangement made of an electrically conductive member of high resistance having a characteristics that resistance changes as the applied voltage changes (i.e., resistance is controlled by a semiconductive region). In the electrically conductive member of high resistance, the current increases exponentially as the applied voltage increases.

It is important to comprehend the above-described characteristics that the current increases exponentially as the applied voltage increases. This is because whether the transferring is excellently performed or not depends on whether the correct transfer current is generated or not. The more rapid the current changes, the narrower the range of the transfer voltage becomes, and therefore it becomes difficult to adjust a transfer table. Because of these reasons, the above described characteristics is one of the most important parameters of the characteristics of the transfer arrangement.

Moreover, there is another reason why the above characteristics is one of the most important parameters as follows. A predetermined voltage is applied to the photosensitive drum and the shaft of the transfer roller. When the printing is performed on a recording medium (such as a postcard) having a narrow width and high resistance, a voltage applied to a part of the transfer arrangement on which the recording medium does not exist is lower than a voltage applied to a part of the transfer arrangement on which the recording medium exists, and a different therebetween is proportional to resistance of the recording medium. If the current is expressed as an exponential function of the applied voltage, the current tends to be larger in the part of the transfer arrangement on which the recording medium does not exist than in the part of the transfer arrangement on which the recording medium exist. Thus, in the total amount of the measurable current, an amount of the current resulting from the movement of the toner is small. Accordingly, the transfer efficiency is low, even when the total amount of the transfer current is large. Moreover, when the transfer voltage increases, the amount of the current flowing into the non-print region of the transfer arrangement also increases, and may cause an electric shock (i.e., a transfer shock) on the photosensitive drum. From this viewpoint, the above characteristics is one of the most important parameters of the characteristics of the transfer arrangement.

A voltage dependence ΔR of the resistance (i.e., the dependence of the resistance on the voltage) is defined for relatively comparing the degrees of the changes of the resistances with respect to the applied voltages. Comparison voltages respectively higher and lower than a voltage that causes a predetermined current (for example, 10 μA) to flow are expressed as V1 and V2 (=2×V1). The resistance at the comparison voltage V1 is referred to as R1, and the resistance at the comparison voltage V2 is referred to as R2. The voltage dependence ΔR of the resistance (hereinafter, simply referred to as voltage dependence ΔR) is expressed as follows:

$$\Delta R=(R(V1)-R(V2))/R(V1)$$

In the case of the electrically conductive member whose resistance is controlled by a semiconductive region, the lower the voltage dependence ΔR is, the higher the transfer efficiency becomes.

The resistances R (V1) and R (V2) of the transfer roller are measured in the same direction as the transferring of the toner in the transfer unit, on condition that the transfer roller contacts a drum-shaped metal and rotates together with the drum-shaped metal at temperature of 20 degrees centigrade and at humidity of 50%. The resistances R (V1) and R (V2) of the transfer/transport belt are measured in the same direction as the transferring of the toner in the transfer unit, on condition that the transfer/transport belt is nipped by two rotating drum-shaped metals at temperature of 20 degrees centigrade and at humidity of 50%.

Further, the voltage dependence ΔR of the transfer arrangement (composed of a plurality of electrically conductive members) is obtained by measuring the relationship between the applied voltage and the generated current of each electrically conductive member, and by combining the results of the electrically conductive members. The resistances R (V1) and R (V2) (or the comparison voltages V1 and V2) can be suitably chosen from higher and lower values respectively lower and higher than the resistance (or the applied voltage) that causes a target current to flow.

The reason of choosing the current of 10 μA is that the current corresponds to (i.e., substantially equals to) the transfer current in the printer. The charging amount of the toner and the charging amount of the elements of the respective electrophotographic processes vary with the type of the printer, and therefore the optimum current varies with the type of the printer. In such a case, it is preferable to determine the voltage dependence ΔR based on the lower and higher resistances (or voltages) respectively lower and higher than the resistance (or voltage) that causes the optimum transfer current to flow.

The conventional transfer arrangement composed of an electrically conductive member whose resistance is controlled by the semiconductive region generally has a high voltage dependence ΔR. For example, in the case of a conventional transfer roller having a conductive resilient portion made of EPDM (ethylene propylene diene monomer) to which carbon black is added, the voltage dependence ΔR is 0.75. In the case of a conventional transfer/transport belt made of polyamide to which carbon black is added, the voltage dependence ΔR is 0.86. The voltage dependence ΔR of both of the transfer roller and the transfer/transport belt are high. The voltage dependence ΔR of the conventional transfer arrangement (combining the transfer roller with the voltage dependence ΔR of 0.75 and the transfer/transport belt with the voltage dependence ΔR of 0.86) is 0.78. Thus, the voltage dependence ΔR of the conventional transfer arrangement is high.

Conventionally, there is a type of the transfer roller having a conductive resilient portion to which electrolyte or electrically conducive polymer is added for lowering the voltage dependence ΔR. As the transfer arrangement includes the transfer roller whose voltage dependence ΔR is lowered by adding electrolyte or electrically conducive polymer, it is possible to lower the voltage dependence ΔR of the transfer arrangement whose resistance is controlled by the semiconductive region. In the case where the electrically conductive member is made of a conductive material having ohmic character, the voltage dependence ΔR is 0.

The example of the above described conventional transfer arrangement is disclosed in Japanese Laid-Open Patent Publication No. 2002-14543.

However, in the conventional transfer arrangement whose voltage dependence ΔR is 0 (i.e., the transfer arrangement made of a conductive material having ohmic character), very high transfer voltage is needed to generate the optimum transfer current. As a result, the load on the transfer power source may increases, and the lifetime of the transfer arrangement may be shortened.

Moreover, in the conventional transfer arrangement whose voltage dependence ΔR is high (i.e., whose resistance is controlled by the semiconductive region), it is possible to lower the transfer voltage, but the leakage of the transfer current may occur in the vicinity of the end portion in the width direction of the recording medium, with the result that the transfer efficiency of the toner may decrease. In particular, if the printing is performed on a thick paper having a narrow width, a back side of a postcard, or an end portion of a special media (for example, a film or an OHP sheet), a transferred image may become blurred, and therefore the printing quality may be degraded.

Additionally, it becomes possible to obtain a sufficient printing quality on the above described recording media, by using the conventional transfer roller having the conductive resilient portion to which electrolyte or electrically conducive polymer is added. However, in order to add electrolyte or electrically conducive polymer to the conductive resilient portion of the transfer roller, the solubility to an insulation material is required. Therefore, the choice of the insulation material, the electrolyte and the electrically conducive polymer are limited. Thus, compared with the carbon black, the electrolyte and the electrically conducive polymer may become expensive, and therefore the cost of the transfer roller increases.

SUMMARY OF THE INVENTION

An object of the present invention is to provide a transfer arrangement capable of obtaining excellent printing quality at low cost, reducing the load on a transfer power source, and increasing the lifetime of the transfer arrangement.

According to the invention, there is provided a transfer arrangement used in a transfer portion of an image forming apparatus. The transfer arrangement includes an electrically conductive member that contacts a toner image bearing member of the image forming apparatus. The electrically conductive member is composed of polyurethane resin to which electrically conducive polymer is added. An adding amount of the electrically conducive polymer with respect to the polyurethane resin is from 8 wt % to 40 wt %.

Because the electrically conductive member (that contacts the image bearing member) of the transfer arrangement is constructed as above, it becomes possible to lower the voltage dependence of the whole electrically conductive member even when another electrically conductive member (that forms a suitable nip against the toner image bearing member) has a high voltage dependence. Thus, it becomes possible to obtain excellent printing quality at low cost, to reduce the load on a transfer power source, and to increase the lifetime of the transfer arrangement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the attached drawings:

FIG. 28 shows the voltages applied by the transfer power sources of K, Y, M and C transfer units of the single path printer according to Embodiment 3 of the present invention when the transfer current of K transfer unit is 8.7 μA and the transfer currents of Y, M and C transfer units are 8.5 μA, and when the printing is performed on the back side of the postcard in the L/L environment; and FIG. 29 shows the voltages applied by the transfer power sources of the transfer units K, Y, M and C of the single path printer according to Embodiment 4 of the present invention (together with the resistance of a fixed resistor of a transfer circuit of each transfer unit) when each transfer unit has the transfer arrangement EP(2)+PU(1) according to Experiment 2 of Embodiment 1 and the transfer current in each transfer unit is set to 8.7 μA, when the printing is performed on the back side of the postcard in the L/L environment.

DETAILED DESCRIPTION OF THE PREFERRED EMBODIMENT

Embodiments of the present invention will be described with reference to the attached drawings.

General Description

Figure 1:
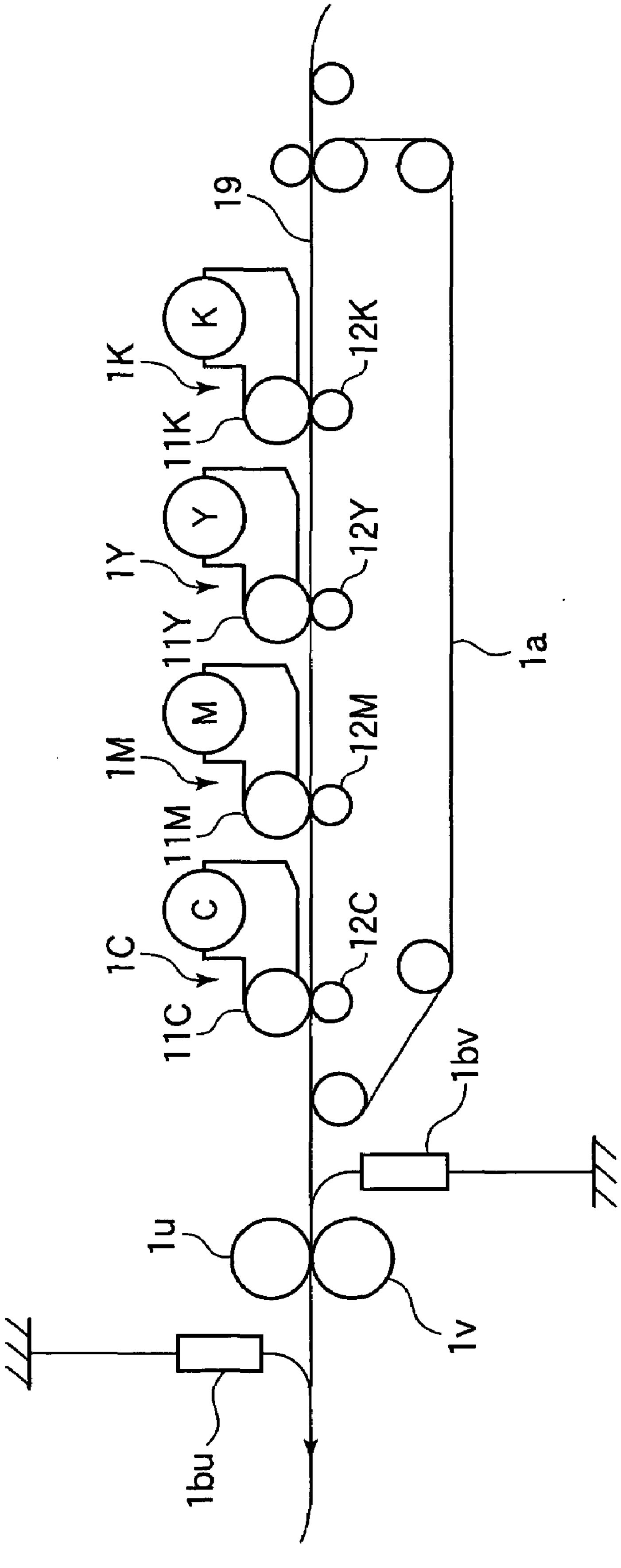
FIG. 1 shows a configuration of a tandem type color electrophotographic printer in which a recording medium is transported along a single path to which the present invention is employed.

FIG. 1 shows the configuration of a tandem type color electrophotographic printer in which a recording medium is transported along a single-path. The printer shown in FIG. 1 includes four image drum cartridges (i.e., ID cartridges) 1K, 1Y, 1M and 1C corresponding to black (K), yellow (Y), magenta (M) and cyan (C). The printer shown in FIG. 1 further includes a transfer and transport belt (i.e., a transfer/transport belt) 1*a*, a fixing roller 1*u*, a pressure roller 1*v* and static elimination brushes 1*bu* and 1*bv*.

The ID cartridge 1K includes a photosensitive drum (i.e., a toner image bearing body) 11K and a transfer roller 12K. The ID cartridge 1Y includes a photosensitive drum (i.e., a toner image bearing body) 11Y and a transfer roller 12Y. The ID cartridge 1M includes a photosensitive drum (i.e., a toner image bearing body) 11M and a transfer roller 12M. The ID cartridge 1C includes a photosensitive drum (i.e., a toner image bearing body) 11C and a transfer roller 12C.

The ID cartridge 1K constitutes a K-transfer unit. The ID cartridge 1Y constitutes a Y-transfer unit. The ID cartridge 1M constitutes an M-transfer unit. The ID cartridge 1C constitutes a C-transfer unit. That is, the printer shown in FIG. 1 includes the four transfer units (transfer portions) of black (K), yellow (Y), magenta (M) and cyan (C). The K, Y, M and C transfer units (i.e., the ID cartridges 1K, 1Y, 1M and 1C) are arranged in this order from the upstream side to the downstream side along the transporting path of a recording medium 19.

Figure 2:
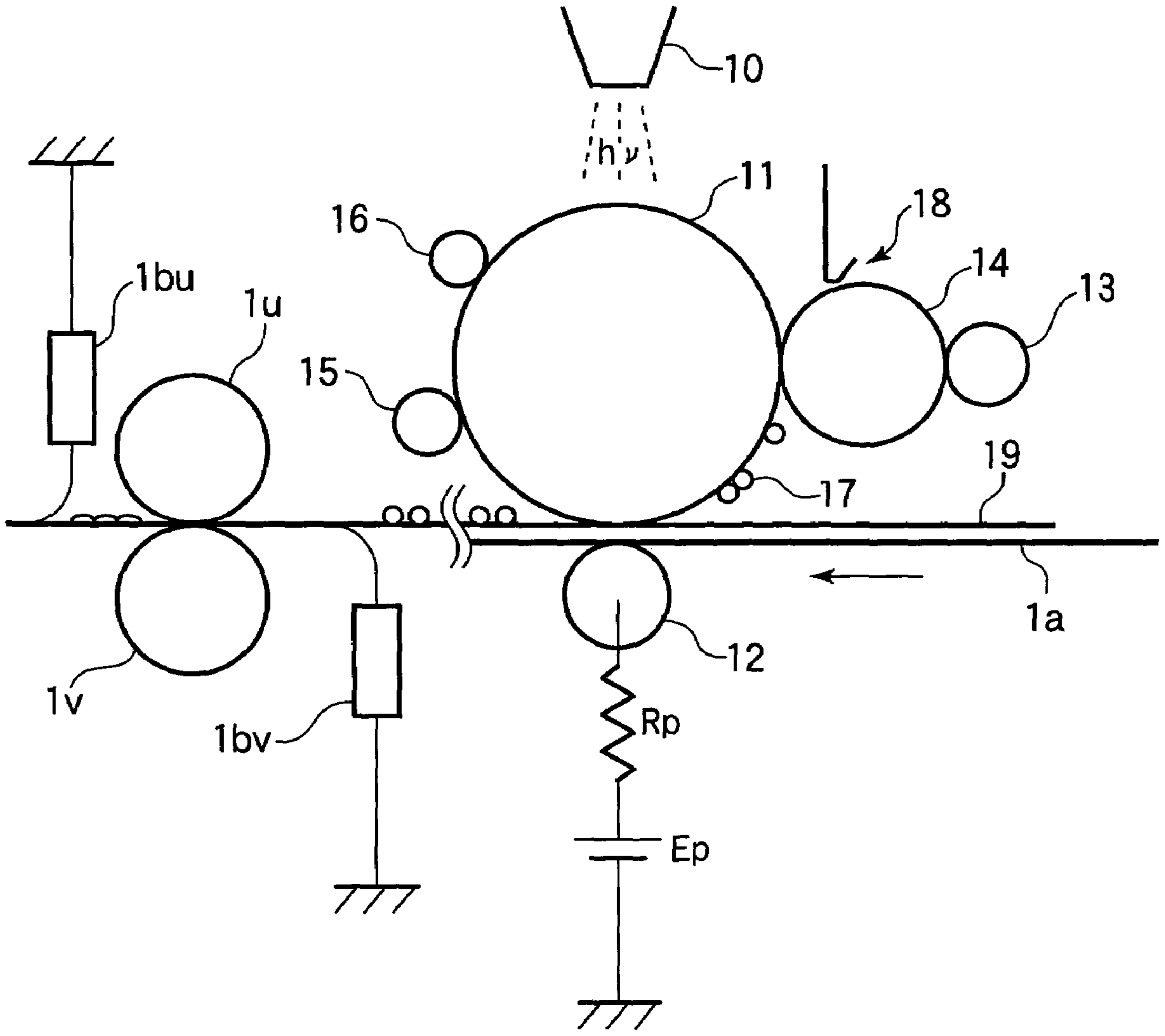
FIG. 2 shows a transfer unit provided in the printer shown in FIG. 1.

FIG. 2 shows the configuration of each of the K, Y, M and C transfer units. The components that are the same as those shown in FIG. 1 is denoted by the same numerals as those in FIG. 1 with the mark K, Y, M and C being omitted. Each of the K, Y, M and C transfer units includes a photosensitive drum 11, a transfer roller 12 as an electrically conductive member (i.e., a component of a transfer arrangement), a toner supply sponge roller 13, a developing roller 14, a cleaning roller 15, a charging roller 16, an exposing unit (for example, an LED head) 10, a developing blade 18, a transfer/transport belt 1*a* as another electrically conductive member (i.e., another component of the transfer arrangement), and a fixed resistor Rp and a transfer power source Ep. In FIG. 2, the photosensitive drum 11 and the transfer roller 12 respectively represent, for example, the photosensitive drum 11K and the transfer roller 12K in the K transfer unit. The transfer/transport belt 1*a* is commonly used for all of the K, Y, M and C transfer units.

In the printer shown in FIG. 1, the recording means 19 is attached to the transfer/transport belt 1*a* by means of dielectric polarization of the recording medium 19 caused by the application of high voltage, and transported by the transfer/transport belt 1*a*. While the recording medium 19 is transported by the transfer/transport belt 1*a* through the ID cartridges 1K, 1Y, 1M and 1C in this order, the toners 17 of black, yellow, magenta, cyan are transferred to the recording medium 19.

In each of the K, Y, M and C transfer units, the toner 17 adhering to the surface of the photosensitive drum 11 reaches a transfer position at a timing when the recording medium 19 is transported to the transfer position. In this transfer position, a voltage (ranging from several hundreds volts to several thousand volts) is applied to the photosensitive drum 11 and a shaft 121 of the transfer roller 12. As the toner is negatively charged, the voltage is applied to the transfer roller 12 so that the electric potential of the transfer roller 12 is higher than the photosensitive drum 11.

Figure 3:
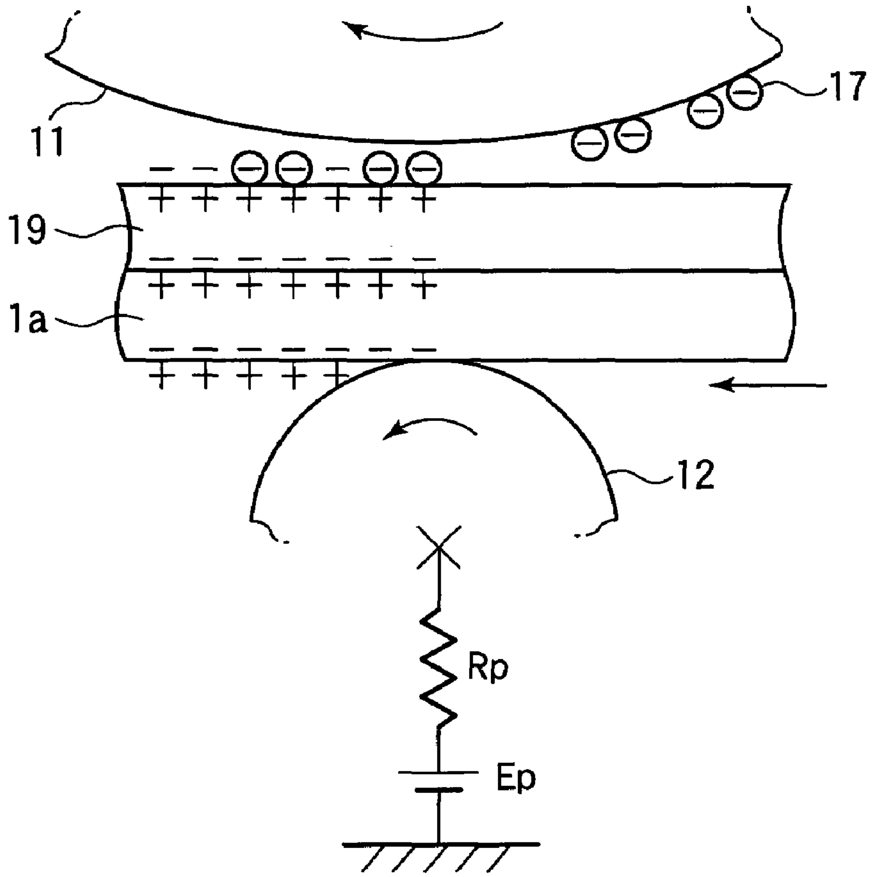
FIG. 3 is a sectional view illustrating a transfer process of the transfer unit shown in FIG. 2.

FIG. 3 is a sectional view illustrating a transfer process of the transfer unit shown in FIG. 2. As shown in FIG. 3, the side of the transfer/transport belt is contacting the photosensitive drum 11 is positively charged due to the dielectric polarization of the recording medium 19, and therefore electrostatic attracting force is applied to the toner 17, with the result that the toner 17 is transferred to the recording medium 19.

The toner 17 that has been transferred to the recording medium 19 (in the transfer process) is attached to the recording medium 19 only by weak electrostatic force. Then, the toner 17 is heated by the fixing roller 1*u* and the pressure roller 1*v* (provided on the downstream side of the C transfer unit) to a high temperature, so that the toner 17 is molten and fixed to the recording medium 19. After the toner is fixed to the recording medium 19, the recording medium 19 is ejected to a not shown eject tray.

The toner 17 moves from the photosensitive drum 11 to the recording medium 19, together with the movement of electric charge where no toner 17 exists, and therefore a current (referred to as a transfer current) flows. The transfer current and the printing quality have close relationship. In the printer shown in FIG. 1, the voltages (i.e., the transfer voltages) applied by the transfer power sources Ep of the K, Y, M and C transfer units are individually controlled so that the optimum transfer currents are generated.

The transfer arrangement of the transfer unit includes a transfer/transport belt 1*a* as an electrically conductive member that contacts the photosensitive drum 11, and the transfer roller 12 as another electrically conductive member that does not contact the photosensitive drum 11 but forms a suitable nip against the photosensitive drum 11. The electrically conductive member for forming the nip is generally composed of a resilient roller, but the same function can be obtained by using, for example, a brush, a sheet or the like.

Figure 4:
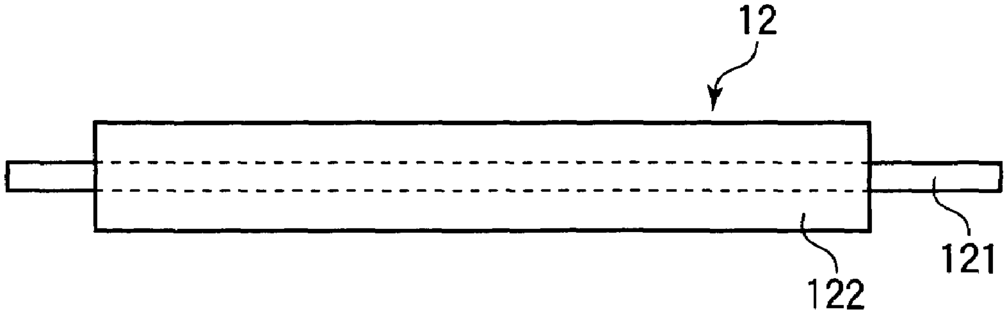
FIG. 4 is a sectional view of the transfer roller in the transfer unit shown in FIG. 2.

FIG. 4 shows the structure of the transfer roller 12. As shown in FIG. 4, the transfer roller 12 includes a conductive shaft 121 and a conductive resilient portion 122. It is possible that the conductive resilient portion 122 is composed of a plurality of layers including a conductive resilient layer and a conductive non-resilient layer.

Figure 5:
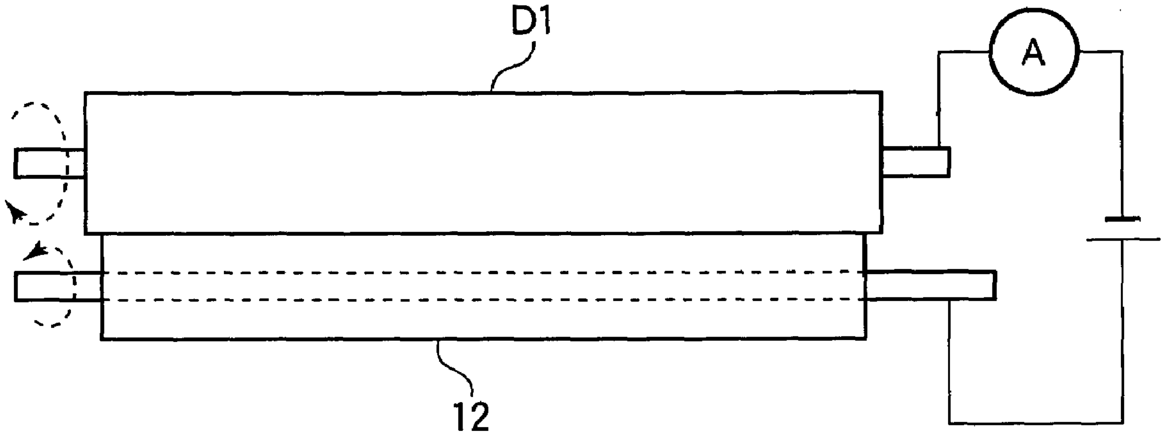
FIG. 5 shows the measuring process of the resistance of the transfer roller.
Figure 6:
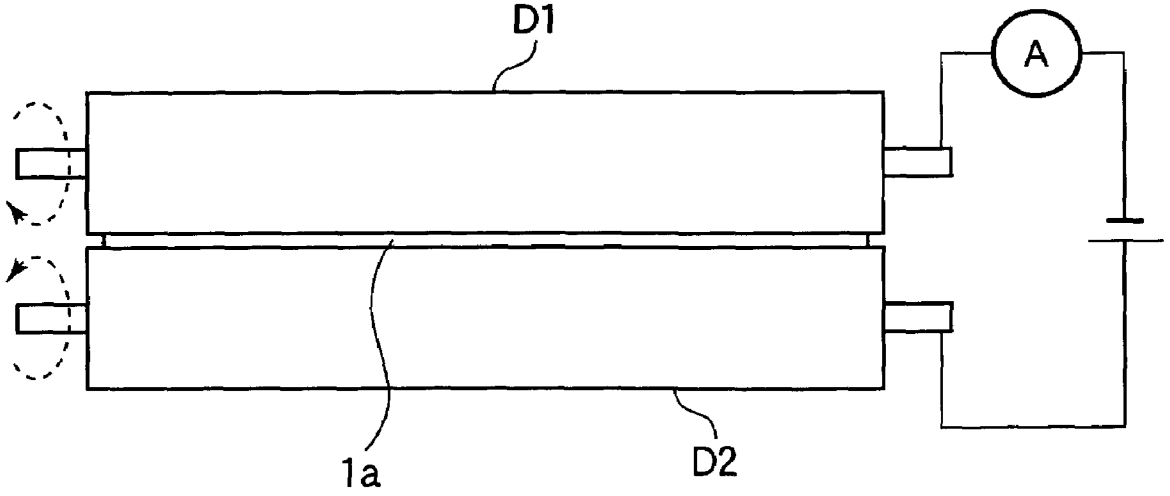
FIG. 6 shows the measuring process of the resistance of the transfer/transport belt.
Figure 7:
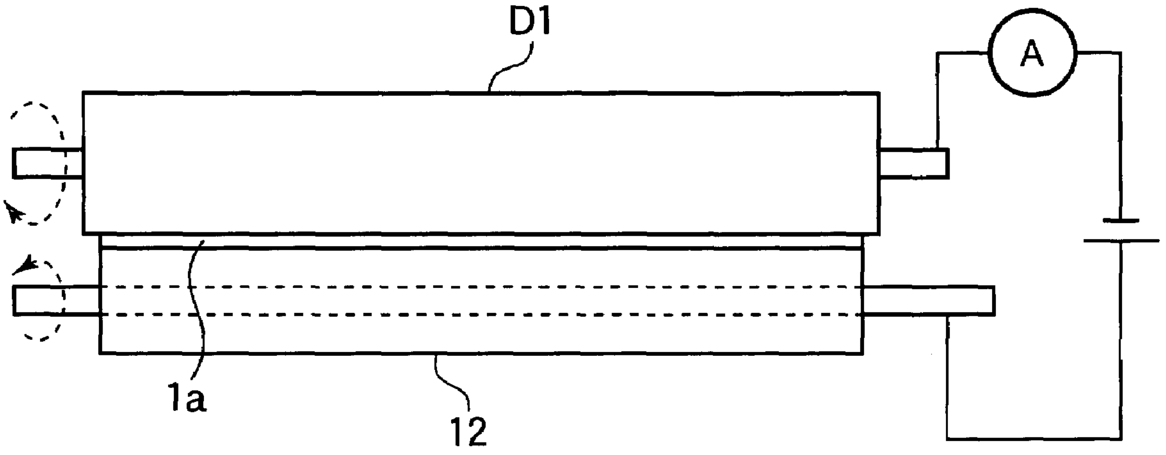
FIG. 7 shows the measuring process of the combined resistance of the transfer roller and the transfer/transport belt.

FIG. 5 shows a measuring process of the resistance of the transfer roller 12. FIG. 6 shows a measuring process of the resistance of the transfer/transport belt 1*a*. FIG. 7 shows a measuring process of the combined resistance of the transfer roller 12 and the transfer/transport belt 1*a*. As shown in FIG. 5, the resistance of the transfer roller 12 is measured on condition that the transfer roller 12 contacts a drum-shaped metal D1 and rotates together with the drum-shaped metal D1. As shown in FIG. 6, the resistance of the transfer/transport belt 1*a* is measured on condition that the transfer/transport belt 1*a* is nipped by two rotating drum-shaped metals D1 and D2. As shown in FIG. 7, the combined resistance of the transfer arrangement (i.e., the transfer roller 12 and the transfer/transport belt 1*a*) is measured on condition that the transfer/transport belt 1*a* is nipped by the transfer roller 12 and the drum-shaped metal D1.

As shown in FIGS. 5 through 7, the resistances of the transfer roller 12 and the transfer/transport belt 1*a* are measured in a direction in which the toner is transferred in the respective transfer units shown in FIG. 2. The resistance of the transfer roller 12 is defined on condition that the voltage of 1000 V is applied to the transfer roller 12 at temperature of 20 degrees centigrade and at humidity of 50%. The resistance of the transfer/transport belt 1*a* is defined on condition that the voltage of 200 V is applied to the transfer/transport belt 1*a* at temperature of 20 degrees centigrade and at humidity of 50%.

Figure 8:
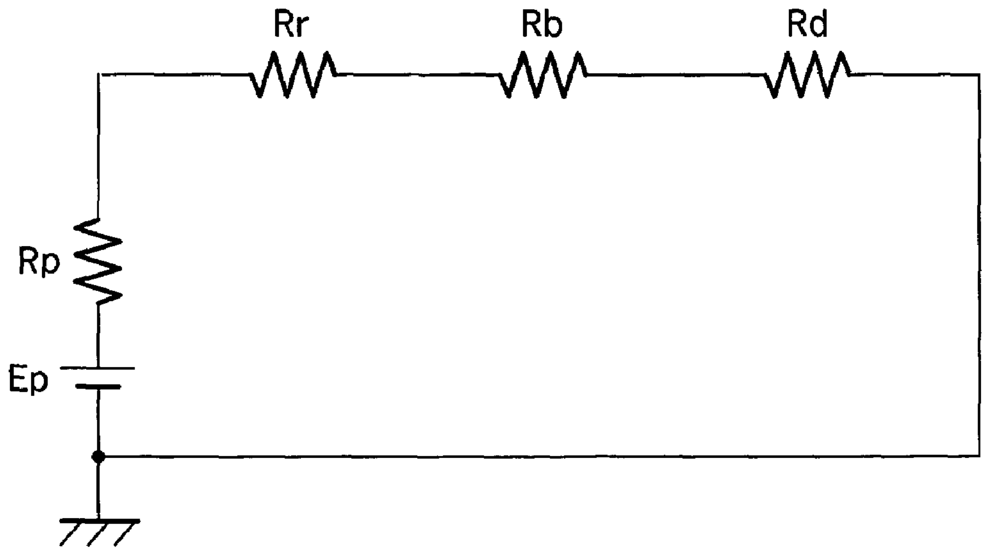
FIG. 8 is a circuit diagram of a transfer circuit of the transfer unit shown in FIG. 2.

FIG. 8 is a circuit diagram of a transfer circuit of the transfer unit shown in FIG. 2. In FIG. 8, the components that are the same as those shown in FIG. 2 are denoted by the same numerals as those in FIG. 2. A transfer roller resistance Rr means an equivalent resistance of the transfer roller 12. A transfer/transport belt resistance Rb means an equivalent resistance of the transfer/transport belt 1*a*. A photosensitive drum resistance Rd means an equivalent resistance of the photosensitive drum 11. The transfer circuit is a series circuit including the transfer power source Ep, the fixed resistor Rp, the transfer roller resistance Rr, the transfer/transport belt resistance Rb and the photosensitive drum resistance Rd.

The variation of the resistances of the transfer/transport belt 1*a* and the transfer roller 12 in the direction of the transferring of the toner may cause the instability of the transfer current (caused by the movement of the toner 17 from the photosensitive drum 11 to the recording medium 19 and the movement of the electric charge where no toner 17 exist), and therefore may directly effect the printing quality. However, such a variation of the transfer current is prevented by the above described fixed resistor Rp (for example, 100 MΩ) inserted in series in the transfer circuit shown in FIG. 8.

Generally, there is a type of transfer roller made of EPDM as an insulation resin to which carbon black (a conductive material) is added. Further, generally, there is a type of transfer/transport belt made of polyamide-imide (an insulation material) to which carbon black (a conductive material) is added.

Hereinafter, the above described transfer roller made of EPDM to which carbon black is added is referred to as a transfer roller EP. The above described transfer/transport belt made of polyamide-imide to which carbon black is added is referred to as a transfer/transport belt PAI. The transfer arrangement composed by the combination of the transfer roller EP and the transfer/transport belt PAI is referred to as a transfer arrangement EP+PAI.

Figures 9, 10:
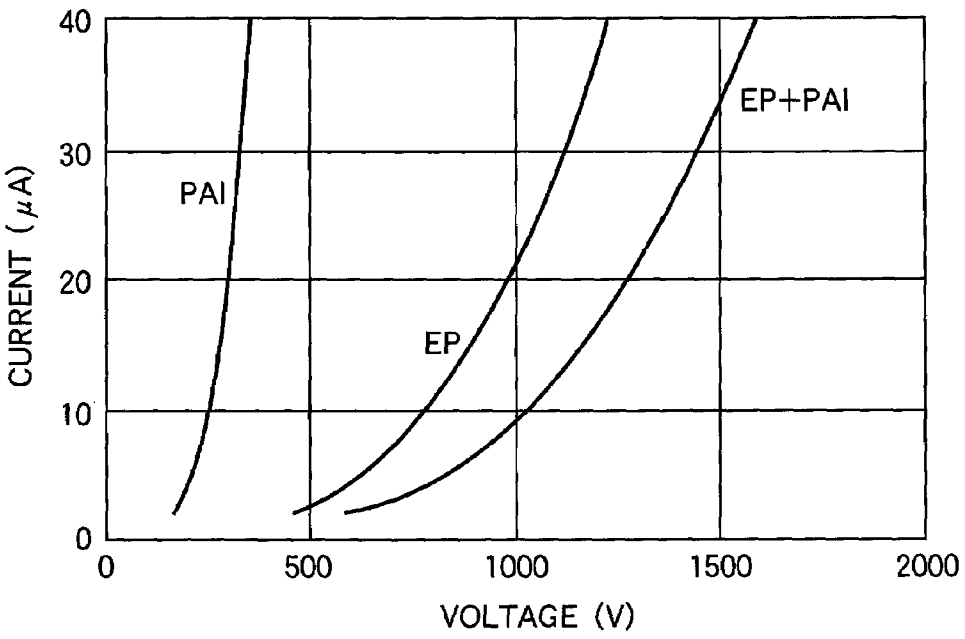
FIG. 9 shows the relationships between the applied voltages and the generated currents of the conventional transfer roller EP, the conventional transfer/transport belt PAI and the combined transfer arrangement EP+PAI.
FIG. 10 shows the resistance of the conventional transfer roller EP and the conventional transfer/transport belt PAI at predetermined applied voltages, and shows the resistances at the generated current of 10 μA, the voltage dependences ΔR and the comparison voltages of the conventional transfer roller EP, the conventional transfer/transport belt PAI and the combined transfer arrangement EP+PAI.

FIG. 9 shows the relationships between the applied voltages and the generated currents of the conventional transfer roller EP, the transfer/transport belt PAI and the transfer arrangement EP+PAI. FIG. 10 shows the resistances of the conventional transfer roller EP, the conventional transfer/transport belt PAI when the applied voltages are 1000 V and 200 V. FIG. 10 further shows the resistances when the generated current is 10 μA, voltage dependences ΔR of the resistance (hereinafter, simply referred to as the voltage dependences ΔR) and the comparison voltages of the conventional transfer roller EP, the conventional transfer/transport belt PAI and the combined transfer arrangement EP+PAI.

According to FIGS. 9 and 10, the resistance of the conventional transfer roller EP (at the applied voltage of 1000 V) is $4.75\times10^{7}$ Ω. The resistance of the conventional transfer/transport belt PAI (at the applied voltage of 200 V) is $4.91\times10^{7}$ Ω.

The conventional transfer roller EP has the voltage dependence ΔR of 0.75 in the range between the lower and higher comparison voltages (460V and 920V) respectively lower and higher than the voltage that causes the current of 10 μA to flow. The conventional transfer/transport belt PAI has the voltage dependence ΔR of 0.86 in the range between the lower and higher comparison voltages (160V and 320V) respectively lower and higher than the voltage that causes the current of 10 μA to flow. The combined resistance of the conventional transfer arrangement EP+PAI composed of the combination of the transfer roller EP and the transfer/transport belt PAI has the voltage dependence ΔR of 0.78 in the range between the lower and higher comparison voltages (620V and 1240V) respectively lower and higher than the voltage that causes the current of 10 μA to flow.

When the current of 10 μA is generated, the resistance of the conventional transfer roller EP is $7.81\times10^{7}$ Ω, and the applied voltage is 781 V. When the current of 10 μA is generated, the resistance of the conventional transfer/transport belt PAI is $2.49\times10^{7}$ Ω, and the applied voltage is 249 V. When the current of 10 μA is generated, the resistance of the conventional transfer arrangement EP+PAI is $1.03\times10^{8}$ Ω, and the applied voltage is 1030 V.

As shown in FIGS. 9 and 10, in each of the conventional transfer roller EP and the conventional transfer/transport belt PAI, the generated current largely changes according to the change of the applied voltage, and the voltage dependence ΔR is high. Therefore, the voltage dependence ΔR of combined resistance of the conventional transfer arrangement EP+PAI becomes high (ΔR=0.78).

The printing test is performed, for example, in the following process. In the N/N environment (i.e., at temperature of 20 degrees centigrade and at humidity of 50%), and in the L/L environment (i.e., at temperature of 10 degrees centigrade and at humidity of 20%), grey scale patterns and solid patterns are printed on the back sides of the postcards. After printing, a range in which printing is excellently performed is determined.

In the case of the gray scale pattern, the density of the toner on the image bearing body (per unit surface) is low, and therefore the transferring can be performed by a relatively low transfer voltage. In the case of the solid pattern, the density of the toner on the image bearing body is at its maximum, and therefore a relatively high transfer voltage is needed. In the practical use, a variety of patterns are printed on one recording medium. Therefore, in order to determine the performance of the transfer arrangement, it is necessary to determine whether both of the gray scale pattern and the solid pattern can be clearly printed at the same transfer voltage.

The above described range in which printing is excellently performed means a range in which a blurred portion or a dust does not generate. The printed pattern on the recording medium is observed by naked eyes. The blurred portion means a low density part of the transferred image. The dust is caused by the strong transfer voltage that causes the toner to adhere to the recording medium before the toner reaches the transfer portion (nip portion) and to make a hollow part on the transferred image. The blurred portion is generated when the transfer voltage is too low, for example, lower than 8 μA. The dust is generated when the transfer voltage is too high, for example, higher than 10 μA.

Figure 11:
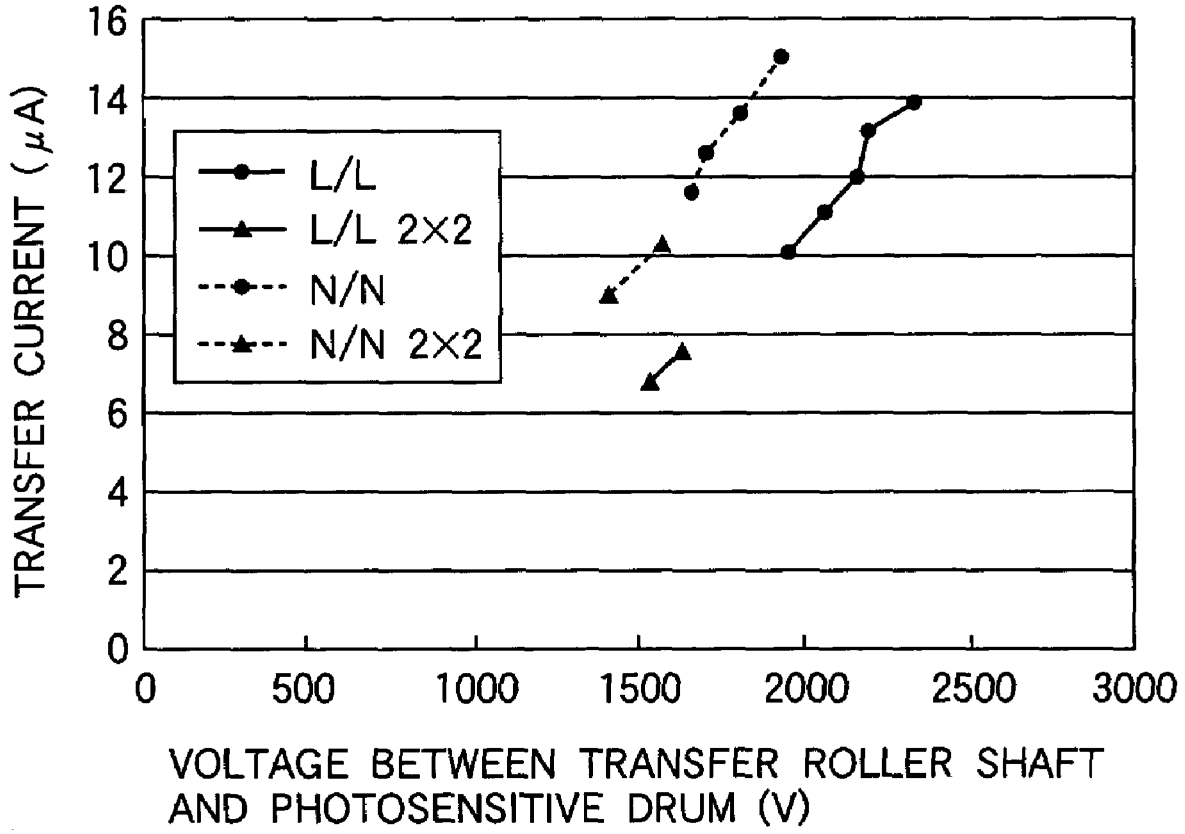
FIG. 11 shows a result of a printing test on the transfer arrangement EP+PAI.

FIG. 11 shows the result of the printing test (using the conventional transfer arrangement EP+PAI) when the solid pattern is printed in the L/L environment, when the gray scale pattern (2×2) is printed in the L/L environment, when the solid pattern is printed in the N/N environment, and when the gray scale pattern (2×2) is printed in the N/N environment. In particular, FIG. 11 shows the ranges of the applied voltages (between the shaft of the transfer roller and the photosensitive body) and the generated currents in which the excellent printing result is obtained.

The result of the printing test in the N/N environment will be described. As shown in FIG. 11, the gray scale pattern (2×2) is excellently printed when the applied voltages ranges from 1420 V to 1580 V, and when the generated current ranges from 9.0 to 10.3 μA. The solid pattern is excellently printed when the applied voltages ranges from 1680 V to 1950 V, and when the generated current ranges from 11.5 to 15.0 μA. There is no range of the voltage in which both of the gray scale pattern and the solid pattern can be excellently printed. Therefore, the conventional transfer arrangement EP+PAI can not correctly print the gray scale pattern and the solid pattern (both of which exist with each other in an image to be printed on one recording medium) on the back side of the postcard in the N/N environment.

The result of the printing test in the L/L environment will be described. As shown in FIG. 11, the gray scale pattern (2×2) is excellently printed when the applied voltages ranges from 1540 V to 1640 V, and when the generated current ranges from 6.8 to 7.6 μA. The solid pattern is excellently printed when the applied voltages ranges from 1970 V to 2350 V, and when the generated current ranges from 10.0 to 13.8 μA. There is no range of the voltage in which both of the gray scale pattern and the solid pattern can be excellently printed. Therefore, the conventional transfer arrangement EP+PAI can not correctly print the gray scale pattern and the solid pattern (both of which exist with each other in an image to be printed on one recording medium) on the back side of the postcard in the L/L environment.

Embodiment 1

In Embodiment 1 of the present invention, the transfer/transport belt is manufactured as follows. Polypyrrole as electrically conducive polymer is solved in DMAC (Dimethylacetamide: $(CH_3)_2NCOCH_3$) as solution. Isocyanate (R—N═C═O) is added to the solution, and then dopant from which OH-group and COOH group are removed is added to the solution. The resulting solution is formed into a cylindrical seamless body having a predetermined circumferential length by means of spin method. The seamless body is cut into pieces each of which has a predetermined length. As a result, the transfer/transport belt made of polyurethane resin to which polypyrrole (as an agent for providing electrical conductivity) is added is obtained.

It is preferable to use proton acid as the above described dopant. In particular, it is preferable to use the proton acid whose acid dissociation constant pKa is less than 4.8%. As such proton acid, it is possible to use, for example, inorganic acid (hydrochloric acid, sulfuric acid, nitric acid, phosphoric acid, hydrogen boride-fluoride, fluoroboric acid, fluorophosphorus acid, perchloric acid, or the like) or organic acid whose acid dissociation constant pKa is less than 4.8%.

In Embodiment 1, the transfer roller is manufactured as follows. The carbon black (as conductive particles) is added to EPDM as insulation material. Then, the EPDM (to which the carbon black is added) is extruded together with the shaft, and the extruded body is vulcanized and foamed. Then, the extruded body is cut into pieces and is polished so that each piece has a predetermined length and a predetermined diameter, with the result that the transfer roller is obtained.

In Embodiment 1, the transfer arrangement is composed of the combination of two electrically conductive members (i.e., the transfer roller and the transfer/transport belt) as will be described in the following Experiments 1, 2 and 3. In Experiments 1 through 3, the same transfer/transport belts (made by DMAC to which 20 wt % of polypyrrole is added) are used. The transfer rollers used in Experiments 1 through 3 are different from each other. Hereinafter, the common transfer/transport belts made of polyurea to which 20 wt % of polypyrrole is added is referred to as a transfer/transport belt PU(1).

In Experiment 2, the adding amount of the carbon black to the transfer roller is smaller than in Experiment 1. In Experiment 3, the adding amount of the carbon black to the transfer roller is further smaller than in Experiment 2. Hereinafter, the transfer roller (made of EPDM) of Experiment 1 is referred to as EP(1). The transfer roller (made of EPDM) of Experiment 2 is referred to as EP(2), and the transfer roller (made of EPDM) of Experiment 3 is referred to as EP(3).

The transfer arrangement of Experiment 1 is obtained by the combination of the transfer roller EP(1) and the transfer/transport belt PU(1). The transfer arrangement of Experiment 2 is obtained by the combination of the transfer roller EP(2) and the transfer/transport belt PU(1). The transfer arrangement of Experiment 3 is obtained by the transfer roller EP(3) and the transfer/transport belt PU(1). Hereinafter, the transfer arrangement of Experiment 1 is referred to as a transfer arrangement EP(1)+PU(1). The transfer arrangement of Experiment 2 is referred to as a transfer arrangement EP(2)+PU(1). The transfer arrangement of Experiment 3 is referred to as a transfer arrangement of EP(3)+PU(1).

Figures 12, 13:
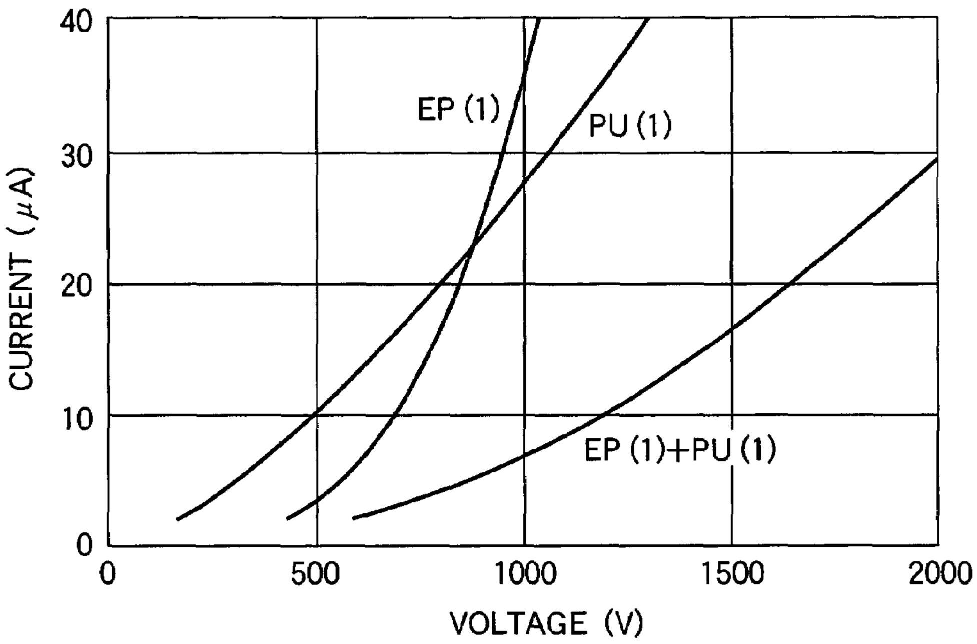
FIG. 12 shows the relationships between the applied voltages and the generated currents of a transfer roller EP(1), a transfer/transport belt PU(1) and a combined transfer arrangement EP(1)+PU(1) according to Experiment 1 of Embodiment 1 of the present invention.
FIG. 13 shows the resistances of the transfer roller EP(1) and the transfer/transport belt PU(1) at predetermined applied voltages, and shows the resistances at the generated current of 10 μA, the voltage dependences ΔR and the comparison voltages of the transfer roller EP(1), the transfer/transport belt PU(1) and the combined transfer arrangement EP(1)+PU(1) according to Experiment 1 of Embodiment 1.

FIG. 12 shows the relationship between the applied voltage and the generated current of the transfer roller EP(1), the transfer/transport belt PU(1) and the combined transfer arrangement EP(1)+PU(1) according to Experiment 1. FIG. 13 shows the resistances of the transfer roller EP(1) and the transfer/transport belt PU(1) according to Experiment 1 at the applied voltages of respectively 1000 V and 200 V. FIG. 13 further shows the resistances (at the generated current of 10 μA), the voltage dependences ΔR and the comparison voltages of the transfer roller EP(1), the transfer/transport belt PU(1) and the transfer arrangement EP(1)+PU(1) according to Experiment 1.

Figures 14, 15:
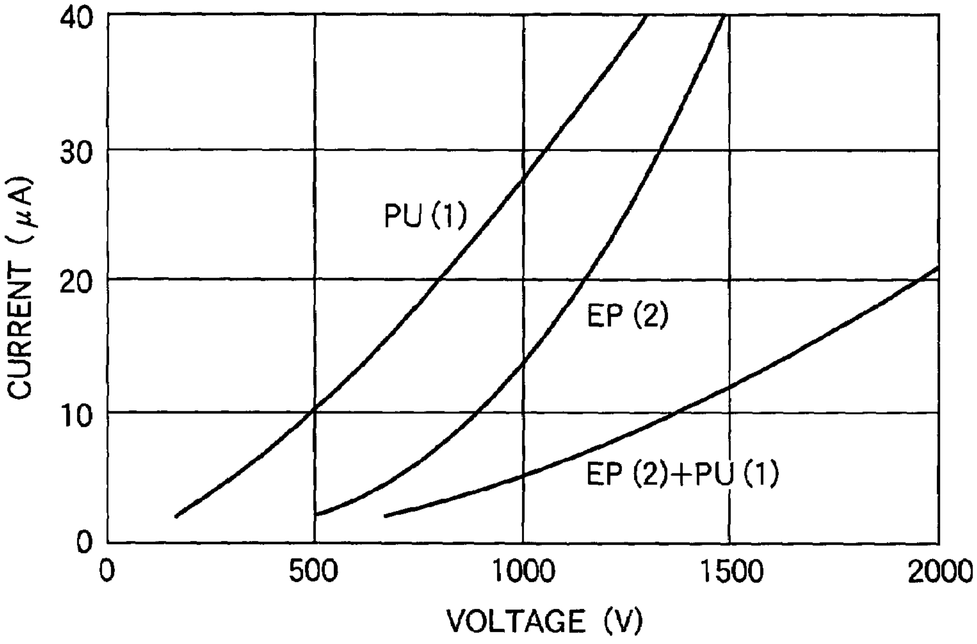
FIG. 14 shows the relationships between the applied voltages and the generated currents of the transfer roller EP(2), the transfer/transport belt PU(1) and the combined transfer arrangement EP(2)+PU(1) according to Experiment 2 of Embodiment 1.
FIG. 15 shows the resistances of the transfer roller EP(2) and the transfer/transport belt PU(1) at predetermined applied voltages, and shows the resistances at the generated current of 10 μA, the voltage dependence ΔR and the comparison voltages of the transfer roller EP(2), the transfer/transport belt PU(1) and the combined transfer arrangement EP(2)+PU(1) according to Experiment 2 of Embodiment 1.

FIG. 14 shows the relationship between the applied voltages and the generated voltages of the transfer roller EP(2), the transfer/transport belt PU(1) and the combined transfer arrangement EP(2)+PU(1) according to Experiment 2. FIG. 15 shows the resistances of the transfer roller EP(2) and the transfer/transport belt PU(1) according to Experiment 2 at the transfer voltages of 1000 V and 200 V, and shows the resistances at the generated current of 10 μA, the voltage dependences ΔR and the comparison voltages of the transfer roller EP(2), the transfer/transport belt PU(1) and the transfer arrangement EP(2)+PU(1) according to Experiment 2.

Figures 16, 17:
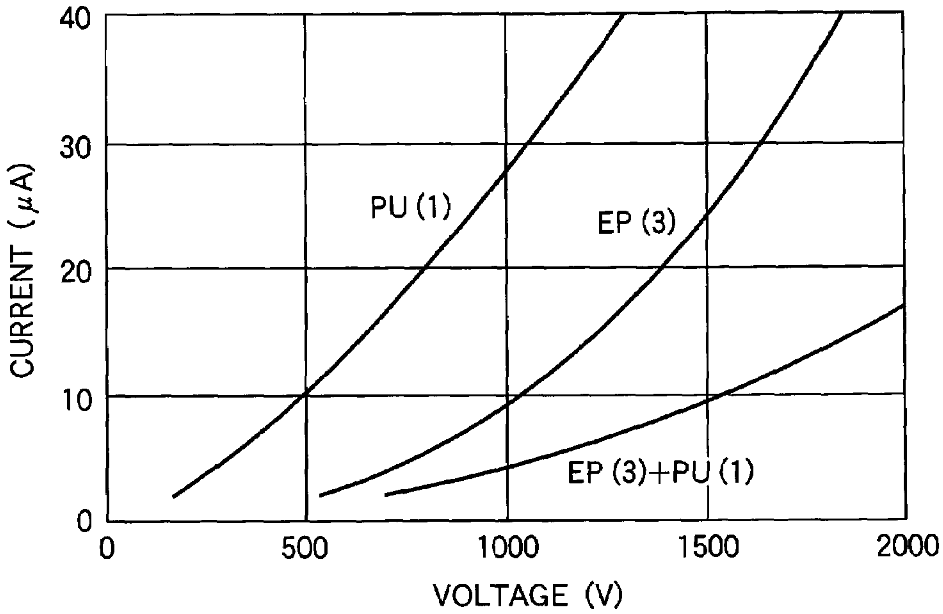
FIG. 16 shows the relationships between the applied voltages and the generated currents of the transfer roller EP(3), the transfer/transport belt PU(1) and the combined transfer arrangement EP(3)+PU(1) according to Experiment 3 of Embodiment 1.
FIG. 17 shows the resistances of the transfer roller EP(3) and the transfer/transport belt PU(1) at predetermined applied voltages (1000V and 200V), and shows the resistances at the generated current of 10 μA, the voltage dependences ΔR and the comparison voltages of the transfer roller EP(3), the transfer/transport belt PU(1) and the combined transfer arrangement EP(3)+PU(1) according to Experiment 3 of Embodiment 1.

FIG. 16 shows the relationships between the applied voltages and the generated voltages of the transfer roller EP(3), the transfer/transport belt PU(1) and the combined transfer arrangement EP(3)+PU(1) according to Experiment 3. FIG. 17 shows the resistances of the transfer roller EP(3) and the transfer/transport belt PU(1) according to Experiment 3 at the transfer voltages of 1000 V and 200 V, and shows the resistances at the generated current of 10 μA, the voltage dependences ΔR and the comparison voltages of the transfer roller EP(1), the transfer/transport belt PU(1) and the transfer arrangement EP(3)+PU(1) according to Experiment 3.

As shown in FIGS. 12 and 13, the resistance of the transfer/transport belt PU(1) used in Experiments 1 thorough 3 (at the applied voltage of 200 V) is $7.07\times10^7$ Ω. In the range between the lower and higher comparison voltages (330 V and 660 V) respectively lower and higher than the voltage that causes the current of 10 μA to flow, the voltage dependence ΔR of the transfer/transport belt PU(1) is 0.26. The resistance (at the generated current of 10 μA) of the transfer arrangement EP(1)+PU(1) composed of the combination of the transfer roller EP(1) and the transfer/transport belt PU(1) is $4.94\times10^7$ Ω (i.e., the applied voltage is 494 V).

Further, as shown in FIGS. 12 and 13, the resistance of the transfer roller EP(1) of Experiment 1 (at the applied voltage of 1000 V) is $2.86\times10^7$ Ω. In the range between the lower and higher comparison voltages (420 V and 840 V) respectively lower and higher than the voltage that causes the current of 10 μA to flow, the voltage dependence ΔR of the transfer roller EP(1) is 0.80.

Moreover, in the range between the lower and higher comparison voltages (690 V and 1380 V) respectively lower and higher than the voltage that causes the current of 10 μA to flow, the voltage dependence ΔR of the transfer arrangement EP(1)+PU(1) composed of the combination of the transfer roller EP(1) and the transfer/transport belt PU(1) is 0.57.

The resistance of the transfer roller EP (1) of Experiment 1 at the generated current of 10 μA is $6.85\times10^7$ Ω (i.e., the applied voltage is 685 V). The combined resistance of the transfer arrangement EP(1)+PU(1) of Experiment 1 at the generated current of 10 μA is $1.18\times10^8$ Ω (i.e., the applied voltage is 1179 V).

As shown in FIGS. 14 and 15, the resistance of the transfer roller EP(2) of Experiment 2 (at the applied voltage of 1000 V) is $7.45\times10^7$ Ω. In the range between the lower and higher comparison voltages (500 V and 1000 V) respectively lower and higher than the voltage that causes the current of 10 μA to flow, the voltage dependence ΔR of the transfer roller EP(2) is 0.70. In the range between the lower and higher comparison voltages (905 V and 1810 V) respectively lower and higher than the voltage that causes the current of 10 μA to flow, the voltage dependence ΔR of the transfer arrangement EP(2)+PU(1) composed of the combination of the transfer roller EP(2) and the transfer/transport belt PU(1) is 0.53.

The resistance of the transfer roller EP (2) of Experiment 2 at the generated current of 10 μA is $9.02\times10^{7}$ Ω (i.e., the applied voltage is 902 V). The combined resistance of the transfer arrangement EP(2)+PU(1) of Experiment 2 at the generated current of 10 μA is $1.37\times10^{8}$ Ω (i.e., the applied voltage is 1371 V).

As shown in FIGS. 16 and 17, the resistance of the transfer roller EP(3) of Experiment 3 (at the applied voltage of 1000 V) is $1.11\times10^{8}$ Ω. In the range between the lower and higher comparison voltages (590 V and 1180 V) respectively lower and higher than the voltage that causes the current of 10 μA to flow, the voltage dependence ΔR of the transfer roller EP(3) is 0.63. In the range between the lower and higher comparison voltages (1080 V and 2160 V) respectively lower and higher than the voltage that causes the current of 10 μA to flow, the voltage dependence ΔR of the transfer arrangement EP(3)+PU(1) composed of the combination of the transfer roller EP(3) and the transfer/transport belt PU(1) is 0.49.

The resistance of the transfer roller EP (3) of Experiment 3 at the generated current of 10 μA is $1.04\times10^{8}$ Ω (i.e., the applied voltage is 1040 V). The combined resistance of the transfer arrangement EP(3)+PU(1) of Experiment 3 at the generated current of 10 μA is $1.53\times10^{8}$ Ω (i.e., the applied voltage is 1534 V).

Figure 18:
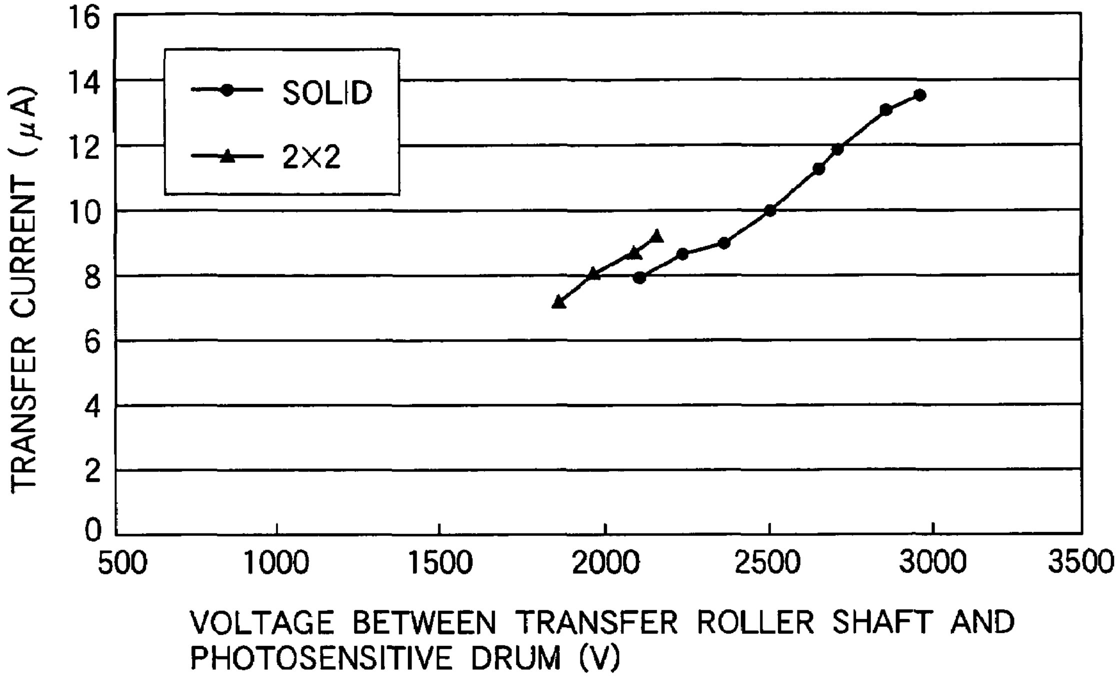
FIG. 18 shows the result of the printing test of the transfer arrangement EP(1)+PU(1) according to Experiment 1 of Embodiment 1 in the L/L environment.

FIG. 18 shows the result of the printing test using the transfer arrangement EP(1)+PU(1) of Experiment 1 in the L/L environment. FIG. 18 shows the ranges of the applied voltages and the transfer currents (between the shaft of the transfer roller and the photosensitive drum) when the solid pattern and the gray scale pattern (2×2) are excellently printed in the L/L environment.

As shown in FIG. 18, the gray scale pattern (2×2) is excellently printed in the L/L environment at the transfer current from 7.2 to 9.2 μA, when the applied voltage ranges from 1870 V to 2170 V. Further, the solid pattern is excellently printed in the L/L environment at the transfer current from 7.9 to 13.4 μA, when the applied voltage ranges from 2120 V to 2980 V. Accordingly, there is a range of the applied voltage in which both patterns can be excellently printed. By setting the applied voltage (between the shaft of the transfer roller and the photosensitive drum) in the range from 2120 V to 2170 V, it becomes possible to correctly print the solid pattern and the gray scale pattern (both of which exist in one image data) on the back side of the postcard. The optimum current when the printing is performed on the back side of the postcard in the L/L environment is, for example, 8.5 μA.

Thus, in Experiment 1, the transfer arrangement EP(1)+PU(1) with the voltage dependence ΔR of 0.57 is obtained by the combination of the transfer roller EP(1) with the voltage dependence ΔR of 0.80 and the transfer/transport belt PU (1) with the voltage dependence ΔR of 0.26. With such a transfer arrangement EP(1)+PU(1), it becomes possible to obtain the sufficient printing quality in the L/L environment.

Figure 19:
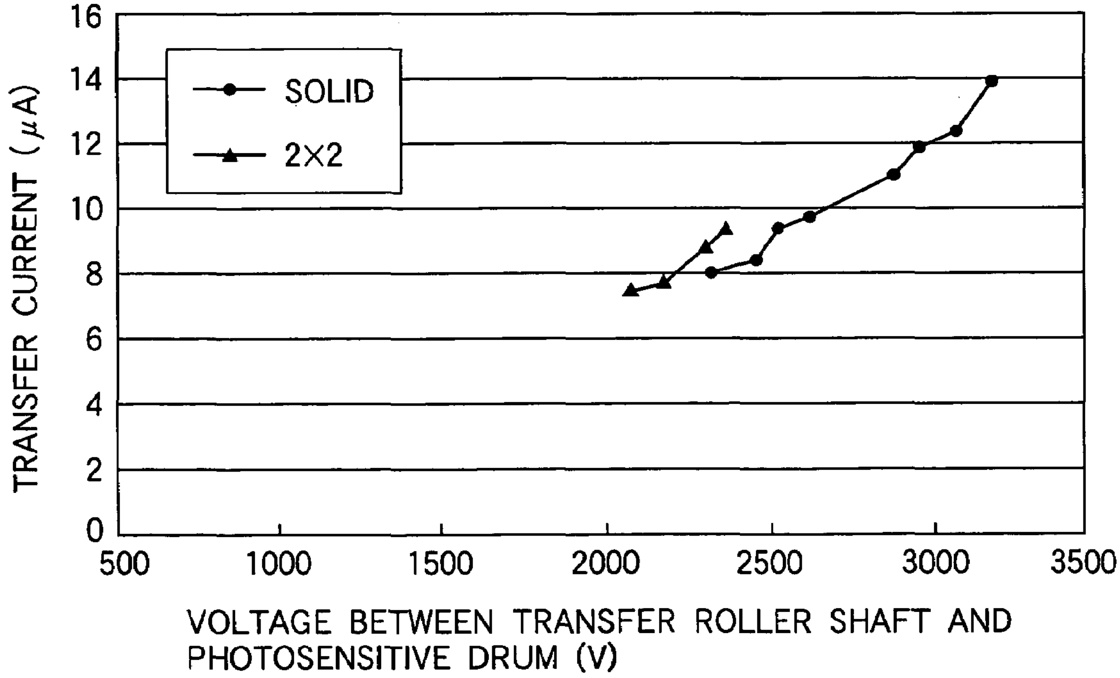
FIG. 19 shows the result of the printing test of the transfer arrangement EP(2)+PU(1) according to Experiment 2 of Embodiment 1 in the L/L environment.

FIG. 19 shows the result of the printing test using the transfer arrangement EP(2)+PU(1) of Experiment 2 in the L/L environment. FIG. 19 shows the ranges of the applied voltages and the transfer currents (between the shaft of the transfer roller and the photosensitive drum) when the solid pattern and the gray scale pattern (2×2) are excellently printed in the L/L environment.

As shown in FIG. 19, the gray scale pattern (2×2) is excellently printed in the L/L environment at the transfer current from 7.5 to 9.4 μA, when the applied voltage ranges from 2070 V to 2360 V. Further, the solid pattern is excellently printed in the L/L environment at the transfer current from 8.0 to 13.9 μA, when the applied voltage ranges from 2320 V to 3190 V. Accordingly, there is a range of the applied voltage in which both patterns can be excellently printed. By setting the applied voltage (between the shaft of the transfer roller and the photosensitive drum) in the range from 2320 V to 2360 V, it becomes possible to correctly print the solid pattern and the gray scale pattern (both of which exist in one image data) on the back side of the postcard. The optimum current when the printing is performed on the back side of the postcard in the L/L environment is, for example, 8.7 μA.

Thus, in Experiment 2, the transfer arrangement EP(2)+PU(1) with the voltage dependence ΔR of 0.53 is obtained by the combination of the transfer roller EP(2) with the voltage dependence ΔR of 0.70 and the transfer/transport belt PU (1) with the voltage dependence ΔR of 0.26. With such a transfer arrangement EP(2)+PU(1), it becomes possible to obtain the sufficient printing quality in the L/L environment.

Figures 20, 21:
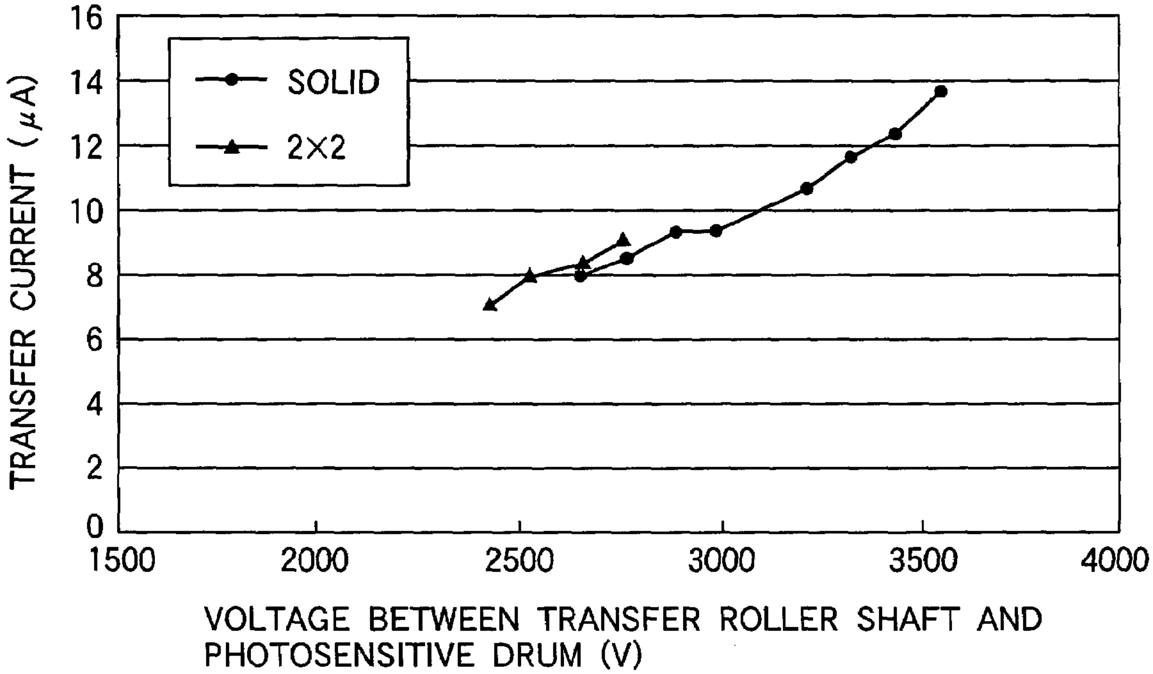
FIG. 20 shows the result of the printing test of the transfer arrangement EP(3)+PU(1) according to Experiment 3 of Embodiment 1 in the L/L environment.
FIG. 21 shows the resistance (at the applied voltage of 200 V) of the transfer/transport belt according to Embodiment 1, when the adding amount of polypyrrole is varied.

FIG. 20 shows the result of the printing test using the transfer arrangement EP(3)+PU(1) of Experiment 3 in the L/L environment. FIG. 20 shows the ranges of the applied voltages and the transfer currents (between the shaft of the transfer roller and the photosensitive drum) when solid pattern and the gray scale pattern (2×2) are excellently printed in the L/L environment.

As shown in FIG. 20, the gray scale pattern (2×2) is excellently printed in the L/L environment at the transfer current from 7.0 to 9.1 μA, when the applied voltage ranges from 2425 V to 2755 V. Further, the solid pattern is excellently printed in the L/L environment at the transfer current from 7.9 to 13.7 μA, when the applied voltage ranges from 2650 V to 3545 V. Accordingly, there is a range of the applied voltage in which both patterns can be excellently printed. By setting the applied voltage (between the shaft of the transfer roller and the photosensitive drum) in the range from 2650 V to 2755 V, it becomes possible to correctly print the solid pattern and the gray scale pattern (both of which exist in one image data) on the back side of the postcard.

Thus, in Experiment 3, the transfer arrangement EP(3)+PU(1) with the voltage dependence ΔR of 0.49 is obtained by the combination of the transfer roller EP(3) with the voltage dependence ΔR of 0.63 and the transfer/transport belt PU (1) with the voltage dependence ΔR of 0.26. With such a transfer arrangement EP(3)+PU(1), it becomes possible to obtain the sufficient printing quality in the L/L environment.

In Embodiment 1, it is possible to vary the resistance of the transfer/transport belt by varying the amount of the polypyrrole added to DMAC. Hereinafter, the transfer/transport belt according to Embodiment 1 made of polyurea to which polypyrrole is added is referred to as a transfer/transport belt PU.

FIG. 21 shows the resistances of the transfer/transport belt PU at the applied voltage of 200 V when the adding amount of the polypyrrole is varied. As shown in FIG. 21, when the adding amount of the polypyrrole is 20 wt %, the resistance (at the applied voltage of 200 V) of the transfer/transport belt PU(1) is $7.07\times10^{7}$ Ω as was described in Experiments 1 through 3. In addition, when the adding amount of the polypyrrole is 8 wt %, the resistance (at the applied voltage of 200 V) of the transfer/transport belt PU is $1.02\times10^{9}$ Ω. When the adding amount of the polypyrrole is 12 wt %, the resistance (at the applied voltage of 200 V) of the transfer/transport belt PU is $4.35\times10^{8}$ Ω. When the adding amount of the polypyrrole is 40 wt %, the resistance (at the applied voltage of 200 V) of the transfer/transport belt PU is $1.15\times10^{6}$ Ω.

Moreover, it becomes possible to obtain the transfer/transport belts PU of Embodiment 1 having different voltage dependences ΔR by varying the adding amount of the polypyrrole or other method. For example, in addition to the transfer/transport belt PU(1) whose voltage dependence ΔR is 0.26 as was described in Experiments 1 through 3, it is possible to obtain the transfer/transport belt having the resistance of $7.82\times10^7$ Ω (at the applied voltage of 200 V) and the voltage dependence ΔR of 0.34 (in the range between lower and higher voltages respectively lower and higher than the voltage that causes the current of 10 μA to flow). Therefore, it is also possible to obtain the transfer/transport belt having the voltage dependence ΔR of 0, 0.05, 0.15, 0.5 or 0.86 (in the range between lower and higher voltages respectively lower and higher than the voltage that causes the current of 10 μA to flow).

Figures 22, 23:
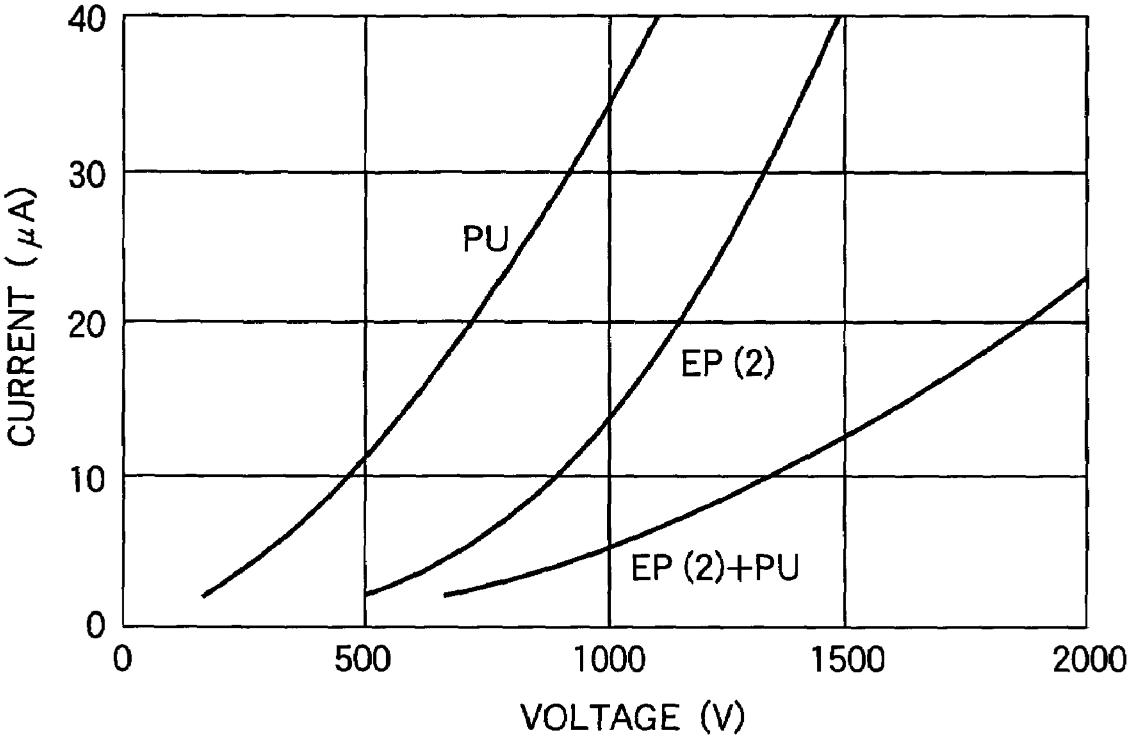
FIG. 22 shows the relationships between the applied voltages and the generated currents of the transfer roller EP(2) according to Experiment 2 of Embodiment 1 and the transfer/transport belt PU (the voltage dependence ΔR is 0.34) according to Embodiment 1, and the combined transfer arrangement EP+PAI.
FIG. 23 shows the result of the printing test of the transfer arrangement EP(2)+PU composed of the combination of the electrically conductive members, i.e., the transfer roller EP(2) according to Experiment 2 of Embodiment 1 and the transfer/transport belt PU according to Embodiment 1 at the voltage dependences ΔR of 0, 0.05, 0.15, 0.26, 0.34, 0.5 or 0.86.

FIG. 22 shows the relationships between the applied voltages and the generated currents of the transfer roller EP(2) of Experiment 2, the transfer/transport belt PU (with voltage dependence ΔR of 0.34) according to Embodiment 1, and the transfer arrangement EP(2)+PU composed of the combination of the transfer roller EP(2) and the transfer/transport belt PU.

As shown in FIG. 22, the transfer roller EP(2) has the resistance (at the applied voltage of 1000 V) of $7.45\times10^7$ Ω and the voltage dependence ΔR of 0.70 in the range between lower and higher voltages respectively lower and higher than the voltage that causes the current of 10 μA to flow. The transfer/transport belt PU has the resistance (at the applied voltage of 200 V) of $7.82\times10^7$ Ω and the voltage dependence ΔR of 0.34 in the range between lower and higher voltages respectively lower and higher than the voltage that causes the current of 10 μA to flow. By combining the transfer roller EP(2) and the transfer/transport belt PU, the transfer arrangement EP(2)+PU is obtained, which has the voltage dependence ΔR (i.e., the dependence of the combined resistance on the voltage) of 0.62 in the range between lower and higher voltages respectively lower and higher than the voltage that causes the current of 10 μA to flow.

FIG. 23 shows the printing test using the transfer arrangement EP(2)+PU composed of the combination of the transfer roller EP(2) of Experiment 2 and the transfer/transport belt PU of Embodiment 1 with the voltage dependence of 0, 0.05, 0.15, 0.26, 0.34, 0.5 or 0.86.

In the second and third columns from the left of FIG. 23 (i.e., the N/N environment and the L/L environment), the mark "O" indicates that there is a range of the applied voltage in which both of the gray scale pattern and the solid pattern (black pattern) are excellently printed without generating the blurred portion or dust. The mark "Δ" indicates that there is a range of the applied voltage in which both of the gray scale pattern and the solid pattern are printed with slightly generating the blurred portion or dust at a low level which does not effects the quality of the usual image such as text image. The mark "x" indicates that there is no range of the applied voltage in which both of the gray scale pattern and the solid pattern (black pattern) are excellently printed without generating the blurred portion or dust.

In the fourth column from the left of FIG. 23 (i.e., the total evaluation), the mark "◎" indicates that there is a range of the applied voltage in which both of the gray scale pattern and the solid pattern are excellently printed in both of the N/N and L/L environments. The mark "O" indicates that there is a range of the applied voltage in which both of the gray scale pattern and the solid pattern (black pattern) are excellently printed in only one of the N/N environment and the L/L environments. The mark "x" indicates that there is no range of the applied voltage in which both of the gray scale pattern and the solid pattern (black pattern) are excellently printed in either of the N/N environment or the L/L environments.

As shown in FIG. 23, when the voltage dependence ΔR of the transfer/transport belt PU is 0, 0.05, 0.15 or 0.26, there is a range of the applied voltage in which both of the gray scale pattern and the solid pattern are excellently printed in both of the N/N and L/L environments. Conversely, when the voltage dependence ΔR of the transfer/transport belt PU is 0.5 or 0.86, there is no range of the applied voltage in which both of the gray scale pattern and the solid pattern are excellently printed in either of the N/N environment or the L/L environments.

When the voltage dependence ΔR of the transfer/transport belt PU is 0.34, there is no range of the applied voltage in which both of the gray scale pattern and the solid pattern are excellently printed in both of the N/N and L/L environments. However, there is a range in which both of the gray scale pattern and the solid pattern are excellently printed in the N/N environment only. Although the transfer/transport belt PU with the voltage dependence ΔR of 0.34 does not satisfy the transferring quality in the L/L environment, the transfer/transport belt PU satisfies the transferring quality in the N/N environment, and therefore the transfer/transport belt PU (with the voltage dependence ΔR of 0.34) can be used when high precision printing is not required.

In order to improve the printing performance (for example, high printing speed or high resolution), it is preferred that the voltage dependence ΔR of the transfer/transport belt is low. This is because the lower the voltage dependence is, the higher the transfer efficiency becomes, with the result that high print speed or high resolution can be easily accomplished. From this viewpoint, the conventional transfer/transport belt with the voltage dependence ΔR of 0 is preferred, rather than the conventional transfer/transport belt PAI with high voltage dependence ΔR.

However, in the case of the conventional transfer arrangement with the voltage dependence ΔR of 0, a voltage for obtaining a predetermined transfer current increases, and therefore a load on the supply voltage of the power source increases, and the lifetime of the transfer/transport belt is shortened. Thus, in order to decrease the load on the transfer power source, and to lengthen the lifetime of the transfer/transport belt, it is preferred that the voltage dependence ΔR is not 0.

Thus, in order to improve the transfer efficiency, to decrease the load on the transfer power source, and to lengthen the lifetime of the transfer/transport belt, it is preferred that transfer/transport belt has the voltage dependence ΔR to some extent as is the case with the transfer/transport belt PU(1) of Experiments 1 through 3.

The electric voltage of the transfer/transport belt is higher in the L/L environment than in the N/N environment, and increases according to the number of printed recording media. In the L/L environment, the resistance of the transfer/transport belt PU(1) of Experiments 1 through 3 (with the voltage dependence ΔR of 0.26) is 1.4 times that in the N/N environment. Further, in the N/N environment, after the printing of 80000 recording media, the resistance of the transfer/transport belt PU(1) increases to 4.35 times that before the printing. Since the resistance of the transfer/transport belt varies according to the environment or the number of printed recording media, it is important to reduce the load on the transfer power source, and to lengthen the lifetime of the transfer/transport belt.

The voltage dependence ΔR of the transfer/transport belt is expressed as ΔR(b). The voltage dependence ΔR of the transfer roller is expressed as ΔR(r). The voltage dependence ΔR of the combined resistance of the transfer arrangement (i.e., the transfer/transport belt and the transfer roller) is expressed as ΔR(r+b). When two transfer/transport belts have the same resistance of $7.07\times10^7$ Ω at the applied voltage of 200 V as is the case with the transfer/transport belt PU(1) of Experiments 1 through 3, when the two transfer/transport belts have the voltage dependence ΔR(b) respectively of 0 and 0.05, and when the same currents of 10 μA are generated in two transfer/transport belts, the transfer unit having the transfer/transport belt with the voltage dependence ΔR(b) of 0.05 is able to reduce the voltage applied by the transfer power source Ep by the voltage of 228 V, compared with the transfer unit having the transfer/transport belt with the voltage dependence ΔR(b) of 0. Since the voltage dependence ΔR(r) of the transfer roller is higher than the voltage dependence ΔR(b) of the transfer/transport belt (=0.05). Therefore, the voltage dependence ΔR(r+b) of the combined resistance of the transfer/transport belt (with the voltage dependence ΔR(b) of 0.05) and the transfer roller is greater than or equals to 0.05 (i.e., ΔR(r+b)≧0.05).

As described above, in the range of the voltage dependence ΔR(b) from 0.05 to 0.34 (i.e., 0.05≦ΔR(b)≦0.34), it becomes possible to accomplish the improvement of the transfer efficiency and the lengthening of the lifetime of the transfer/transport belt. By using the transfer/transport belt PU according to Embodiment 1, it is possible to obtain the above described range of the voltage dependence ΔR(b) of 0.05≦ΔR(b)≦0.34. Furthermore, in the range of the voltage dependence ΔR(r+b) from 0.05 to 0.62 (i.e., 0.05≦ΔR(r+b)≦0.62), it becomes possible to accomplish the improvement of the transfer efficiency and the reduction of the load on the transfer power source.

As described above, according to Embodiment 1, the transfer arrangement includes the transfer/transport belt whose voltage dependence ΔR(b) ranges from 0.05 to 0.34 (0.05≦ΔR(b)≦0.34) made of polyurethane resin to which polypyrrol (8 wt % to 40 wt %) is added. With such a transfer arrangement, it becomes possible to use a transfer roller having high voltage dependence ΔR(r), and to keep the voltage dependence ΔR(r+b) of the transfer arrangement in the range from 0.05 to 0.62 (0.05≦ΔR(r+b)≦0.62). Accordingly, it becomes possible to obtain excellent printing quality, to reduce the load on the transfer power source, and to lengthen the lifetime of the transfer arrangement.

Moreover, the conductive material of the transfer roller can be made of carbon black of low price, and therefore it is possible to reduce the cost of the transfer roller. Additionally, the carbon black does not limit the material of the base polymer of the transfer roller, and therefore it becomes possible to widen the choice of the base polymer. Thus, it becomes possible to choose the base polymer so as to reduce the cost of forming and the cost of material itself. As a result, the cost of the transfer roller can be reduced.

In the above described Embodiment 1, polypyrrol (as an agent for providing electrical conductivity) is added to the polyurethane resin (as a mother material), it is also possible to use other electrically conducive polymer as the agent for providing electrical conductivity.

Furthermore, Embodiment 1 is described with reference to the transfer/transport belt as the electrically conductive member that contacts the toner image bearing body of the tandem type electrophotographic printer. However, it is effective for an electrically conductive member (contacting the toner image bearing member) other than the transfer/transport belt to have the voltage dependence ΔR from 0.05 to 0.34 (i.e., 0.05≦ΔR≦0.34). Moreover, even when the transfer arrangement is composed of a brush or a sheet, it is effective to have the voltage dependence ΔR from 0.05 to 0.34 (i.e., 0.05≦ΔR≦0.34). Additionally, it is effective for a process member (contacting the photosensitive drum) such as the charging roller, the developing roller or the cleaning roller to have the voltage dependence ΔR from 0.05 to 0.34 (i.e., 0.05≦ΔR≦0.34). This is because, the procedure for obtaining the optimum voltage and current and for lengthening the lifetime of the component is the same as those in Embodiment 1.

Embodiment 2

In Embodiment 2, the transfer roller is manufactured as follows. Acetylene black (as conductive particles) is added to silicone rubber (as insulation material). The adding amount of the acetylene black is 50 wt %. The silicone rubber to which acetylene black is added is extruded together with the shaft. The extruded body is vulcanized and foamed. Further, the extruded body is cut into pieces and is polished so that each piece has a predetermined length and a predetermined diameter, with the result that the transfer roller is obtained. Hereinafter, the transfer roller of Embodiment 2 having a conductive resilient portion made of high-conductive silicone to which acetylene black is added is referred to as a transfer roller SIcd.

In Embodiment 2, the transfer/transport belt is manufactured as was described in Embodiment 1. Polypyrrole is solved in DMAC as solution. Isocyanate is added to the solution, and then dopant from which OH-group and COOH group are removed is added to the solution. The resulting solution is formed into a cylindrical seamless body having a predetermined circumferential length by means of spin method. The seamless body is cut into pieces each of which has a predetermined width, with the result that the transfer/transport belt is obtained. The transfer/transport belt (made of polyurea) of Embodiment 2 is expressed as PU(2).

The transfer arrangement of the transfer unit is composed of the combination of two electrically conductive members, i.e., the transfer roller SIcd and the transfer/transport belt PU (2). Such a transfer arrangement is expressed as SIcd+PU(2).

Figures 24, 25:
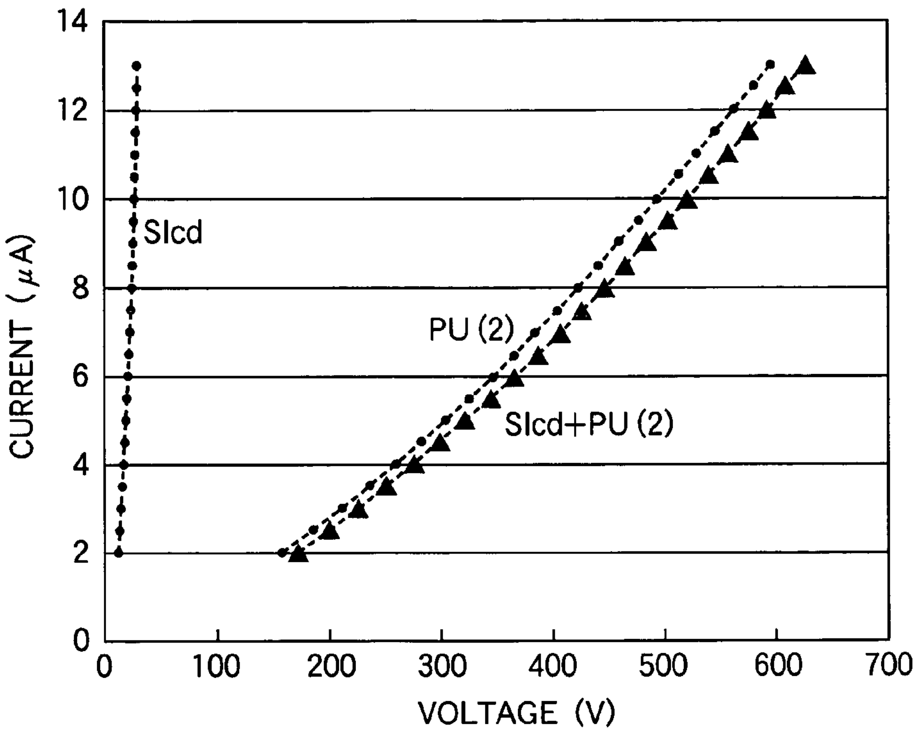
FIG. 24 shows the relationships between the applied voltages and the generated currents of the transfer/transport belt, the transfer roller and the transfer arrangement composed of the combination of the transfer/transport belt and the transfer roller according to Embodiment 2 of the present invention.
FIG. 25 shows the resistances of the transfer roller and the transfer/transport belt at predetermined applied voltages, and shows the resistances at the generated current of 10 μA, the voltage dependences ΔR and the comparison voltages of the transfer roller, the transfer/transport belt and the combined transfer arrangement according to Embodiment 2.

FIG. 24 shows the relationships between the applied voltages and the generated currents of the transfer roller SIcd, the transfer/transport belt PU (2) and the combined transfer arrangement SIcd+PU(2) according to Embodiment 2. FIG. 25 shows the resistances of the transfer roller SIcd and the transfer/transport belt PU(2) according to Embodiment 2 at the transfer voltages of 1000 V and 200 V, and shows the resistances at the generated current of 10 μA, the voltage dependences ΔR and the comparison voltages of the transfer roller SIcd, the transfer/transport belt PU(2) and the transfer arrangement SIcd+PU(2) according to Embodiment 2.

As shown in FIGS. 24 and 25, the resistance of the transfer/transport belt PU(2) of Embodiment 2 (at the applied voltage of 200 V) is $7.07\times10^7$ Ω. Further, in the range between the lower and higher comparison voltages (345 V and 690 V) respectively lower and higher than the voltage that causes the current of 10 μA to flow, the voltage dependence ΔR of the transfer/transport belt PU(2) is 0.25. The resistance of the transfer/transport belt PU(2) at the generated current of 10 μA is $4.94\times10^7$ Ω (i.e., the applied voltage is 494 V).

The resistance of the transfer roller SIcd at the generated current of 10 μA is $2.69\times10^7$ Ω (i.e., the applied voltage is 27 V). Due to the characteristics of the transfer roller SIcd, the electrical conductivity of the transfer roller SIcd remarkably increases (i.e., current suddenly starts to flow) when the applied voltage reaches tens of voltages, and the electrical conductivity is high (as the good conductor) enough to allow the current of more than 100 μA to flow when the applied voltage reaches 100 V.

In the range between the lower and higher comparison voltages (345 V and 690 V) respectively lower and higher than the voltage that causes the current of 10 μA to flow, the voltage dependence ΔR of the combined resistance of the transfer arrangement SIcd+PU(2) is 0.27. The combined resistance of the transfer arrangement SIcd+PU(2) at the generated current of 10 μA is $5.21\times10^{8}$ Ω (i.e., the applied voltage is 521 V).

In the transfer roller SIcd of high electrical conductivity of Embodiment 2, the resistance rapidly changes as the applied voltage increases, and therefore has a very high voltage dependence ΔR which can not be measured. If such a transfer roller of high electrical conductivity is combined with the conventional transfer/transport belt, it is not possible to obtain the suitable range of the voltage dependence ΔR(r+b) (for example, $0.05\leqq\Delta R(R+b)\leqq 0.62$) for improving transfer efficiency and reducing the load on the transfer power source. However, when the transfer roller SIcd is combined with the transfer/transport belt PU(2) having the low voltage dependence (as is the case with the transfer/transport belt PU(1) of Embodiment 1), it is possible to obtain the transfer arrangement whose voltage dependence ΔR(r+b) is in the range in which high transfer efficiency can be obtained and the load on the transfer power source can be reduced.

Figures 26, 27:
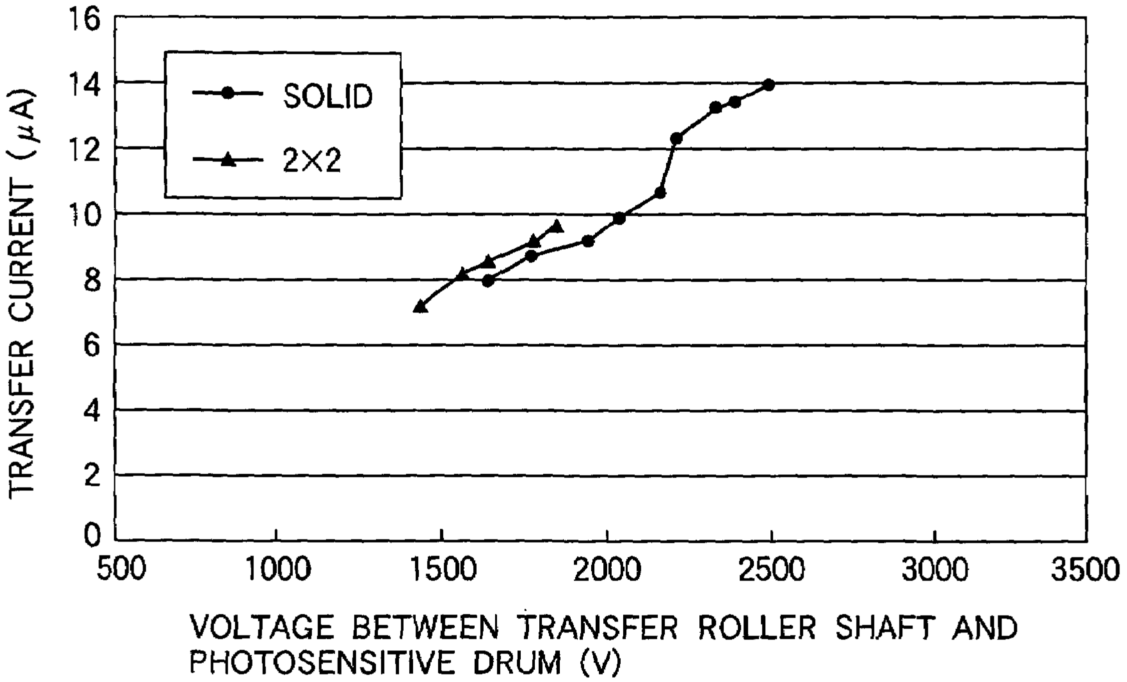
FIG. 26 shows the result of the printing test of the transfer arrangement SIcd+PU according to Embodiment 2 in the L/L environment.
FIG. 27 shows the voltages applied by the transfer power sources of K, Y, M and C transfer units of the single path printer shown in FIG. 1 when each transfer unit has the transfer arrangement EP(2)+PU(1) according to Experiment 2 of Embodiment 1, when the transfer current of each transfer unit is 8.7 μA, and when the printing is performed on the back side of the postcard in the L/L environment.

FIG. 26 shows the result of the printing test using the transfer arrangement SIcd+PU of Embodiment 2 in the L/L environment. In particularly, FIG. 26 shows the ranges of the applied voltage and the generated current (between the shaft of the transfer roller and the photosensitive body) when the solid pattern is excellently printed in the L/L environment and when the gray scale pattern (2×2) is excellently printed the in L/L environment.

As shown in FIG. 26, the gray scale pattern (2×2) is excellently printed in the L/L environment at the transfer current from 7.2 to 9.7 μA, when the applied voltage ranges from 1440 V to 1860 V. Further, the solid pattern is excellently printed in the L/L environment at the transfer current from 8.0 to 14.0 μA, when the applied voltage ranges from 1650 V to 2510 V. Accordingly, there is a range of the applied voltage in which both patterns can be excellently printed. By setting the applied voltage (between the shaft of the transfer roller and the photosensitive drum) in the range from 1650 V to 1860 V, it becomes possible to correctly print the solid pattern and the gray scale pattern (both of which exist in one image data) on the back side of the postcard. The optimum current when the printing is performed on the back side of the postcard in the L/L environment is, for example, 8.8 μA.

As described above, by the combination of the transfer roller SIcd of high electrical conductivity and the transfer/transport belt PU(2) (having the voltage dependence ΔR(b) of 0.25), it is possible to obtain the transfer arrangement SIcd+PU(2) having the voltage dependence ΔR(r+b) of 0.27. With such a transfer arrangement SIcd+PU(2), it becomes possible to obtain the sufficient printing quality in the L/L environment.

As described above, according to Embodiment 2, the transfer arrangement SIcd+PU(2) is composed of the combination of the transfer roller SIcd having high electrical conductivity (low resistance) and the transfer/transport belt PU(2) having the voltage dependence ΔR(b) of 0.25, and therefore it becomes possible to obtain the sufficient printing quality in the L/L environment even when the transfer roller having high electrical conductivity is used.

In the above described Embodiment 2, the transfer roller SIcd is made of silicone rubber to which sufficient amount of acetylene black is added. However, the transfer roller (having high electrical conductivity) can be made of EPDM or the like to which sufficient amount of carbon black or the like is added. In such a case, the transfer arrangement PU(2) can be composed of the transfer arrangement (made of EPDM or the like to which sufficient amount of carbon black or the like is added) and the transfer/transport belt PU(2) having the voltage dependence ΔR(b) of 0.25.

In the above described transfer roller of high electrical conductivity, carbon black of low price can be used as the agent providing electrical conductivity (i.e., the conductive particles), and therefore the cost of the transfer roller can be reduced. Additionally, the carbon black does not limit the material of the base polymer of the transfer roller, and therefore it becomes possible to widen the choice of the base polymer. Thus, it becomes possible to chose the base polymer so as to reduce the cost of forming and the cost of material itself. As a result, the cost of the transfer roller can be reduced.

Generally, it is difficult to form the conductive roller (to which carbon black is added) having a semiconductive region with stability, and therefore the manufacturing yield tends to be low. However, according to Embodiment 2, the resistance of the transfer roller (of high electrical conductivity) is not limited, and therefore the manufacturing yield can be improved. Furthermore, it becomes possible to simplify the inspection process of the resistance of the transfer roller before the shipment, and therefore the manufacturing cost can be reduced.

Moreover, the transfer roller of high electrical conductivity also has an advantage that the increase of the resistance with the passage of time is negligible even if the transfer roller is used for a long time. Thus, the lifetime of the transfer unit can further be lengthened.

Embodiment 3

In a single-path printer shown in FIG. 1, while the toner is transferred to the recording medium in sequence at the transfer positions of the respective transfer units, the resistance increases as the thickness of the toner on the recording medium increases. Embodiments 1 and 2 have focused on the transferring of the toner at each transfer unit. However, in the single-path printer, four color toners are transferred to the recording medium in series, and therefore the resistance of the recording medium (including the toner) is higher at the transfer unit on the downstream side than at the transfer unit on the upstream side. In order to obtain the ideal transfer current (for example, 8.7 μA according to Experiment 2 of Embodiment 1), it is necessary to set the applied voltage of the transfer unit on the downstream side higher than the applied voltage of the transfer unit on the upstream side.

FIG. 27 shows the applied voltages of the transfer power sources Ep at the K, Y, M and C transfer units in the single-path printer shown in FIG. 1. Each of the transfer arrangements of the K, Y, M and C transfer units is composed by the transfer arrangement EP(2)+PU(1) of Experiment 2 of Embodiment 1. In each transfer unit, the transfer current is set to 8.7 μA. The printing is performed on the back side of the postcard in the L/L environment.

As shown in FIG. 27, when the printing is performed on the back side of the postcard in the L/L environment at the transfer current of 8.7 μA on condition that the transfer arrangement EP(2)+PU(1) of Experiment 2 is used in each of the K, Y, M and C transfer units, the transfer voltage (applied by the transfer power source Ep) is 2290 V at the K transfer unit on the most downstream side, and the transfer voltage is 4340 V at the C transfer unit on the most upstream side. Thus, there is a difference in the transfer voltage of 1050 V between the R transfer unit and the C transfer unit.

Moreover, the resistance of the transfer arrangement increases with the number of printed recording media. After the printing of 80000 recording media in the N/N environment using the transfer/transport belt PU(1) of Embodiments 1 through 3, the resistance reaches 4.35 times that before the printing.

As the high voltage is applied to the transfer unit on the downstream side, the load on the transfer power source Ep increases. Further, as the resistance of the transfer arrangement increases with the number of printed recording media, it becomes necessary to increase the voltage applied by the transfer power source, and therefore the load on the transfer power source increases. Thus, it is necessary to increase the capacity of transfer power source Ep, with the result that the cost of the printer increases.

In the single-path printer according to Embodiment 3, the transfer roller EP(2) of Experiment 2 of Embodiment 1 is used as the transfer roller of the K transfer unit on the most upstream side, and the transfer roller EP(1) of Experiment 1 of Embodiment 1 is used as the transfer roller of each of the Y, M and C transfer units (i.e., the transfer units on the downstream side). The resistance of the transfer roller EP(2) at the applied voltage of 1000 V is $7.45\times10^{7}\ \Omega$ (see FIG. 15), and the resistance of the transfer roller EP(1) at the applied voltage of 1000 V is $2.86\times10^{7}\ \Omega$ (see FIG. 13). Thus, the resistance of the transfer rollers EP(1) on the downstream side is lower than the transfer roller EP(2) on the upstream side. Further, the voltage dependence $\Delta R(b)$ of the transfer roller EP(2) is 0.70 (see FIG. 15) and the voltage dependence $\Delta R(b)$ of the transfer roller EP(1) is 0.80 (see FIG. 13). Thus, the voltage dependence $\Delta R(r)$ of the transfer rollers EP(1) on the downstream side is higher than the transfer roller EP(2) on the upstream side. The transfer/transport belt PU(1) of Experiments 1 through 3 is used as the transfer/transport belt of each of the K, Y, M and C transfer units.

As described above, by using the transfer arrangement having low resistance and high voltage dependence $\Delta R(r+b)$ as the transfer unit on the downstream side, it becomes possible to reduce the voltage applied by the transfer power source Ep and to thereby reduce the load on the transfer power source Ep.

In the above described printing test on the back side of the postcard in the L/L environment, the transfer arrangement EP(1)+PU(1) of Experiment 1 exhibits an excellent result when the transfer current ranges from 7.9 to 9.2 μA, and the optimum transfer current is 8.5 μA (see FIG. 18). In the transfer arrangement EP(1)+PU(1) of Experiment 1, the applied voltage is 1150 V at the optimum transfer current of 8.5 μA (see FIG. 12).

In the above described printing test on the back side of the postcard in the L/L environment, the transfer arrangement EP(2)+PU(2) of Experiment 2 exhibits an excellent result when the transfer current ranges from 8.0 to 9.4 μA, and the optimum transfer current is 8.7 μA (see FIG. 19). In the transfer arrangement EP(2)+PU(2) of Experiment 2, the applied voltage is 1310 V at the optimum transfer current of 8.7 μA (see FIG. 14).

Thus, in the case where the transfer unit EP(1) of Experiment 1 is used in the transfer unit on the downstream side, the applied voltage of the transfer roller can be reduced by 160 V (=1310V−1150V), compared with the case in which the transfer unit EP(2) of Experiment 2 is used in the transfer unit on the downstream side. Accordingly, the load on the transfer power source Ep can be reduced.

FIG. 28 shows the voltages applied by the transfer power sources Ep of the K, Y, M and C transfer units in the single-path printer according to Embodiment 3. The transfer current in the K transfer unit is set to 8.7 μA, and the transfer current in the Y, M and C transfer units is set to 8.5 μA. The printing is performed on the back side of the postcard in the L/L environment.

As shown in FIG. 28, the voltage applied by the transfer power source Ep of the Y transfer unit (at the downstream side of the K transfer unit) is 3420 V. The voltage applied by the transfer power source Ep of the M transfer unit (at the downstream side of the Y transfer unit) is 3750 V. The voltage applied by the transfer power source Ep of the C transfer unit (at the most downstream side) is 4180 V. In each of the Y, M and C transfer units, it is possible to reduce the voltage (at the optimum transfer current of 8.5 μA) by 160 V, compared with the case in which the transfer roller EP(2) of Experiment 2 is used in each of the Y, M and C transfer units. Thus, in each of the Y, M and C transfer units, it becomes possible to perform excellent printing.

As described above, according to Embodiment 3, the voltage dependence of the transfer arrangement of the transfer unit on the downstream side is lower than that of the transfer unit on the upstream side, and therefore it becomes possible to restrict the transfer voltage on the downstream side, and to reduce the load on the transfer power source. As a result, it becomes possible to reduce the cost of the transfer power source and to lengthen the transfer/transport belt.

In the above described Embodiment 3, the transfer roller of the K transfer unit on the upstream side includes the transfer roller EP(2) of Experiment 2 of Embodiment 1, and each of the transfer rollers of Y, M and C transfer units on the downstream side includes the transfer rollers EP(1) of Experiment 1 of Embodiment 1. However, it is possible to obtain the same advantage, for example, when the transfer roller of each of the K and Y transfer units on the upstream side is composed by the transfer roller EP(2) of Experiment 2 of Embodiment 1, and the transfer roller of each of the M and C transfer units on the downstream side is composed of the transfer roller EP(1) of Experiment 1 of Embodiment 1.

Moreover, it is also effective that the Y, M and C transfer units (or the M and C transfer units) on the downstream side include transfer rollers having further lower resistance or the transfer rollers SIcd of Embodiment 2 having high electrical conductivity. Further, it is also effective that the C transfer unit on the downstream side includes a transfer roller having further lower resistance or the transfer roller SIcd of Embodiment 2 having high electrical conductivity. The optimum transfer current of the transfer roller SIcd is 8.8 μA in the L/L environment (see FIG. 26), and the applied voltage of the transfer arrangement SIcd+PU(2) at the optimum current of 8.8 μA is 470 V (see FIG. 24). Accordingly, compared with the transfer arrangement EP(2)+PU(1) of Experiment 2 of Embodiment 1, the applied voltage decreases by 840 V. The transfer voltage of the C transfer unit on the most downstream side is 3500 V. Furthermore, as to the transfer roller of high electrical conductivity, the increase of the resistance with the passage of time is negligible, and therefore it becomes possible to lengthen the lifetime of the transfer unit.

Embodiment 4

In the single-path printer shown in FIG. 1, the cost can be reduced by using the same transfer arrangements in the plurality of transfer units. However, in the above described Embodiment 3, it is necessary to use the transfer rollers having different resistances and having different conductivities in the transfer units on the upstream side and the downstream side.

The unit price of a member depends on the cost of the material, the cost of the forming, the yield rate, the working ratio of the manufacturing line or the like. Particularly, in the case of an advanced material (such as the conductive roller), the central value of property of the specification tends to vary from one lot of material (or lot of forming) to another, and the tolerance of the property (such as resistance) tends to be narrow. Thus, in order to form materials having properties slightly different from each other respectively in small batches, it is necessary to precisely control the quality of the materials, and therefore the yield rate may be lowered and the cost may increase. Accordingly, there is a possibility that the cost of the transfer roller may increase in the case where the transfer rollers having different resistances or different conductivities are used in the transfer units on the upstream side and the downstream side.

Therefore, in the single-path printer according to Embodiment 4 of the present invention, the fixed resistors Rp provided in the transfer circuits (FIG. 8) of the respective transfer units have resistances different from each other. In particular, the resistance of the fixed resistor Rp in the transfer circuit of the C transfer unit on the most downstream side is set to 13 MΩ. The resistance of the fixed resistor Rp in the transfer circuit of the M transfer unit on the downstream side is set to 62 MΩ. The resistances of the fixed resistors Rp in the transfer circuits of the K and Y transfer units on the upstream side are set to 100 MΩ.

As described above, by setting the resistance of the fixed resistor Rp on the downstream side lower than the resistance of the fixed resistor Rp on the upstream side, it becomes possible to restrict a drop of the voltage at the fixed resistor Rp in the transfer circuit on the downstream side. Accordingly, it becomes possible to reduce the voltage applied by the transfer power source Ep on the downstream side thereby to reduce the load on the transfer power source Ep, even when the same transfer arrangements are used in the K, Y, M and C transfer units.

FIG. 29 shows the voltages applied by the transfer power sources Ep (as well as the resistances of the fixed resistors Rp) in the transfer circuit of the K, Y, M and C transfer units in the single-path printer according to Embodiment 4. The transfer arrangement of each of the K, Y, M and C transfer units is composed of the transfer arrangement EP(2)+PU(1) of Experiment 2 of Embodiment 1. In each transfer unit, the transfer current is set to 8.7 μA. The printing is performed on the back side of the postcard in the L/L environment.

As shown in the above described FIG. 27, the voltage applied by the transfer power source Ep of the M transfer unit of Embodiment 1 is 3910 V, and the voltage applied by the transfer power source Ep of the C transfer unit of Embodiment 1 is 4340 V.

Conversely, as shown in FIG. 29, since the transfer current is 8.7 μA, the voltage applied by the transfer power source Ep of the M transfer unit of Embodiment 4 (in which the resistance of the fixed resistor is 62 MΩ) is 3580 V, which is lower than M transfer unit of Embodiment 1 (in which the fixed resistor of the transfer circuit is 100 MΩ) by 330 V. The voltage applied by the transfer power source Ep of the C transfer unit of Embodiment 4 (in which the fixed resistor of the transfer circuit is 13 MΩ) is 3580 V, which is lower than the C transfer unit of Embodiment 1 (in which the fixed resistor of the transfer circuit is 100 MΩ) by 760 V.

The voltages applied by the transfer power sources Ep of the M and C transfer units of Embodiment 4 are lowered to 3580 V, which is the same as that of Y transfer unit. The M and C transfer units of Embodiment 4 generate the transfer current of 8.7 μA to perform excellent printing at the applied voltage lower than the M and C transfer units of Embodiment 1.

As described above, according to Embodiment 4, by setting the resistance of the fixed resistor of the transfer circuit on the downstream side lower than that of the transfer circuit on the upstream side, it becomes possible to restrict the increase of the transfer voltage on the downstream side, and to reduce the load on the transfer power source. As a result, it becomes possible to reduce the cost of the transfer power source and to lengthen the transfer/transport belt. Moreover, it becomes possible to use the transfer rollers having the same characteristics and the same properties in all of the K, Y, M and C transfer units, and therefore the cost of the transfer rollers can be reduced because of the effect of mass production. Additionally, the applied voltages of the Y, M and C transfer units are the same as each other, and therefore the controlling of the transfer voltages can be simplified.

In Embodiment 3, the resistance of the fixed resistors of the M and C transfer units on the downstream side are set lower than that of the K transfer unit on the upstream side. However, it is also possible that the resistance of the fixed resistor of the Y transfer unit is lower than that of the K transfer unit, the resistance of the fixed resistor of the M transfer unit is lower than that of the Y transfer unit, and the resistance of the fixed resistor of the C transfer unit is lower than that of the M transfer unit.

In the above described Embodiment 3, the resistance of the fixed resistor of the C transfer unit is lower than that of the M transfer unit. However, it is possible that the resistance of the fixed resistor of the C transfer unit is the same as the that of the M transfer unit (but lower than that of the K transfer unit on the upstream side).

While the preferred embodiments of the present invention have been illustrated in detail, it should be apparent that modifications and improvements may be made to the invention without departing from the spirit and scope of the invention as described in the following claims.

What is claimed is:

1. A transfer arrangement used in a transfer portion of an image forming apparatus, said transfer arrangement comprising:

a first electrically conductive member that contacts a toner image bearing member of said image forming apparatus, and a second electrically conductive member provided to face said toner image bearing member, wherein said first electrically conductive member has a voltage dependence ΔR of electric resistance expressed as follows:

$$0.05 \leqq \Delta R \leqq 0.34,$$

wherein said transfer arrangement including said first and second electrically conductive members has a voltage dependence ΔR of electric resistance expressed as follows:

$$0.05 \leqq \Delta R \leqq 0.62, \text{ and}$$

wherein said first electrically conductive member is made of polyurethane resin to which an electrically conducive polymer is added, and an adding amount of said electrically conducive polymer with respect to said polyurethane resin is from 8 wt % to 40 wt %.

2. The transfer arrangement according to claim 1, wherein said electrically conducive polymer is a polypyrrole.

3. The transfer arrangement according to claim 1, wherein said first electrically conductive member is a transfer and transport belt that transports a recording medium.

4. An image forming apparatus comprising:

a toner image bearing member; and a transfer portion having the transfer arrangement according to claim 1, wherein said second electrically conductive member has a voltage dependence ΔR of electric resistance expressed as follows:

$$0.63 \leqq \Delta R \leqq 0.80.$$

5. The image forming apparatus according to claim 4, wherein said first electrically conductive member is a transport member, and wherein said second electrically conductive member is an electrically conductive transfer rotation body that contacts the transport member.

6. An image forming apparatus comprising:

a toner image bearing member; and a transfer portion having a transfer arrangement according to claim 1, wherein said second electrically conductive member has an electrical conductivity such that a current of more than 100 μA flows at a voltage of 100 V.

7. The image forming apparatus according to claim 6, wherein said first electrically conductive member is a transport member, and wherein second electrically conductive member is a transfer rotation body that contacts the transport member.

8. The transfer member according to claim 1, wherein said first electrically conductive member is a transport member, and said second electrically conductive member is an electrically conductive transfer rotation body that contacts the transport member.

9. An image forming apparatus comprising:

a plurality of toner image bearing members;

a first electrically conductive member provided in contact with said toner image bearing members, and a plurality of second electrically conductive members provided in contact with said first electrically conductive member, wherein each combination of said first and second electrically conductive members contacting each other has a voltage dependence ΔR of electric resistance expressed as follows:

$$0.05 \leqq \Delta R \leqq 0.062$$

wherein at least one combination of said first and second electrically conductive members has a voltage dependence ΔR of electric resistance higher than another combination of said first and second electrically conductive members, and wherein said first electrically conductive member is made of polyurethane resin to which an electrically conducive polymer is added, and an adding amount of said electrically conducive polymer with respect to said polyurethane resin is from 8 wt % to 40 wt %.

10. The image forming apparatus according to claim 9, wherein said another combination of said first and second electrically conductive members is disposed on an upstream side of said at least one combination of said first and second electrically conductive members along a transporting path of a recording medium.

11. The image forming apparatus according to claim 9, wherein said first electrically conductive member is a transport member, and wherein at least one of said electrically conductive members is an electrically conductive transfer rotation body that contacts the transport member.

12. An image forming apparatus comprising:

a plurality of toner image bearing members;

a first electrically conductive member provided in contact with said toner image bearing members, a plurality of second electrically conductive members provided in contact with said first electrically conductive member; and a plurality of transfer circuits generating voltages applied to respective combinations of said first and second electrically conductive members, wherein each combination of said first and second electrically conductive members contacting each other has a voltage dependence ΔR of electric resistance expressed as follows:

$$0.05 \leqq \Delta R \leqq 0.62$$

wherein at least one of said transfer circuits has a fixed resistor whose electric resistance is different from at least another one of said transfer circuits, and wherein said first electrically conductive member is made of polyurethane resin to which an electrically conducive polymer is added, and an adding amount of said electrically conducive polymer with respect to said polyurethane resin is from 8 wt % to 40 wt %.

13. The image forming apparatus according to claim 12, wherein said at least one of said transfer circuits has a fixed resistor whose electric resistance is lower than said at least another one of said transfer circuits and is disposed on an upstream side of said one of said transfer circuits a transporting path of a recording medium.

14. The image forming apparatus according to claim 13, wherein at least one combination of said first and second electrically conductive members receives a voltage higher than another combination of said first and second electrically conductive members, which are disposed on an upstream side of said one combination of said first and second electrically conductive members along a transporting path of a recording medium.

15. The image forming apparatus according to claim 12, wherein said first electrically conductive member is a transport member, and wherein at least one of said second electrically conductive members is an electrically conductive transfer rotation body that contacts the transport member.

* * * * *